(12) United States Patent
Dupra

(10) Patent No.: US 8,669,667 B1
(45) Date of Patent: Mar. 11, 2014

(54) METHOD FOR GENERATING ELECTRICITY

(75) Inventor: David N. Dupra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/599,224

(22) Filed: Aug. 30, 2012

(51) Int. Cl.
*H02K 35/00* (2006.01)

(52) U.S. Cl.
USPC ........................................ 290/1 R

(58) Field of Classification Search
USPC ........................................ 290/1 R
See application file for complete search history.

(56) References Cited

U.S. PATENT DOCUMENTS

| | | | |
|---|---|---|---|
| 3,064,096 A * | 11/1962 | Werner | 335/92 |
| 3,500,451 A * | 3/1970 | Yando | 310/330 |
| 4,387,318 A | 6/1983 | Kolm et al. | |
| 5,839,508 A * | 11/1998 | Tubel et al. | 166/65.1 |
| 6,424,079 B1 | 7/2002 | Carroll | |
| 6,538,349 B1 * | 3/2003 | Lee et al. | 310/15 |
| 7,142,075 B1 * | 11/2006 | Roesler et al. | 335/78 |
| 7,148,591 B2 * | 12/2006 | Mizoguchi et al. | 310/36 |
| 7,196,450 B2 * | 3/2007 | Pinkerton et al. | 310/309 |
| 7,301,435 B2 | 11/2007 | Lussey et al. | |
| 7,498,681 B1 | 3/2009 | Kellogg et al. | |
| 7,560,856 B2 | 7/2009 | Chen et al. | |
| 7,821,144 B2 | 10/2010 | Frayne | |
| 7,839,007 B2 | 11/2010 | Filardo | |
| 7,950,143 B2 | 5/2011 | Fein et al. | |
| 8,026,619 B2 | 9/2011 | Frayne | |
| 8,053,914 B1 | 11/2011 | Krupenkin | |
| 8,258,644 B2 * | 9/2012 | Kaplan | 290/54 |
| 8,519,554 B2 * | 8/2013 | Kaplan | 290/1 R |
| 2008/0129254 A1 * | 6/2008 | Frayne | 322/3 |
| 2008/0136562 A1 * | 6/2008 | Kulah et al. | 333/186 |
| 2009/0295163 A1 * | 12/2009 | Frayne | 290/54 |

FOREIGN PATENT DOCUMENTS

JP 2003274486 A * 9/2003 ............... H04R 9/04

OTHER PUBLICATIONS

"A Variable-Capacitance Vibration-to-Electric Energy Harvester", Barnard C. Yen, Student Member, IEEE, and Jeffrey H. Lang, Fellow, IEEE, IEEE Transactions on Circuits and Systems-1 Fundamental Theory and Applications, 2005.

"Electromagnetic energy harvesting from vibratons of multiple frequencies", Bin Yang, Chengkuo Lee, Wenfeng Xiang, Jin Xie, Johnny Han He, Rama Krishna Kotlanka, Siew Ping Low and Hanhua Feng, Journal of Micromechanics and Microengineering, pp. 1-8, Jan. 30, 2009.

"Axial-Flux Permanent Magnet Machines for Micropower Generation", Andrew S. Holmes, Member, IEEE, Guodong Hong, and Keith R. Pullen, Journal of Microelectromechanical Systems, vol. 14, No. 1, Feb. 2005.

"Harvesting magnetic energy using extensional vibration of laminated magnetoelectric plates", C.L. Zhang, J.S. Yang, W.Q. Chen, Faculty Publications from the Dept. of Engineering Mechanics, University of Nebraska-Lincoln, Jan. 1, 2009.

"Energy Harvesting from the Nonlinear Oscillations of Magnetic Levitation", BP. Mann, N.D. Sims, Published Jun. 27, 2008, Journal of Sound and Vibration.

(Continued)

*Primary Examiner* — Joseph Waks
(74) *Attorney, Agent, or Firm* — Roland R. Schindler, I.

(57) ABSTRACT

An electrical generating method is provided that generates electricity when bending of a first flexible plurality of conductors, a second flexible plurality of conductors and a flexible magnetic field source causes movement of the conductors relative to a magnetic field provided by the magnetic field source.

19 Claims, 21 Drawing Sheets

(56) References Cited

OTHER PUBLICATIONS

"Ribbon Generators, with MHD, Generator and Other Implications", A.D. Moore, Nov. 1960, The University of Michigan Industry Program of the College of Engineering.

"Design of a Linear Generator for Wave Energy Plant", Oskar Danielsson, UPTEC F03 003, Jan. 2003.

"Magnetic properties of material", R. Clarke, Aug. 2, 2008, http//info.ee.surrey.ac.uk/Workshop/advice/coils/mu/.

* cited by examiner

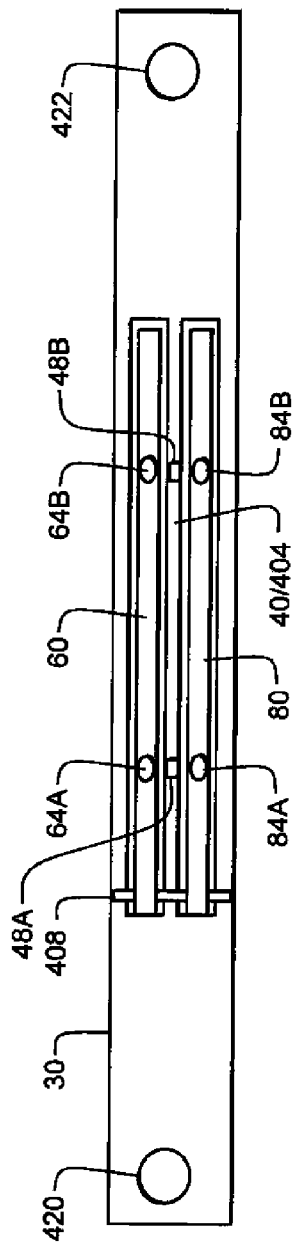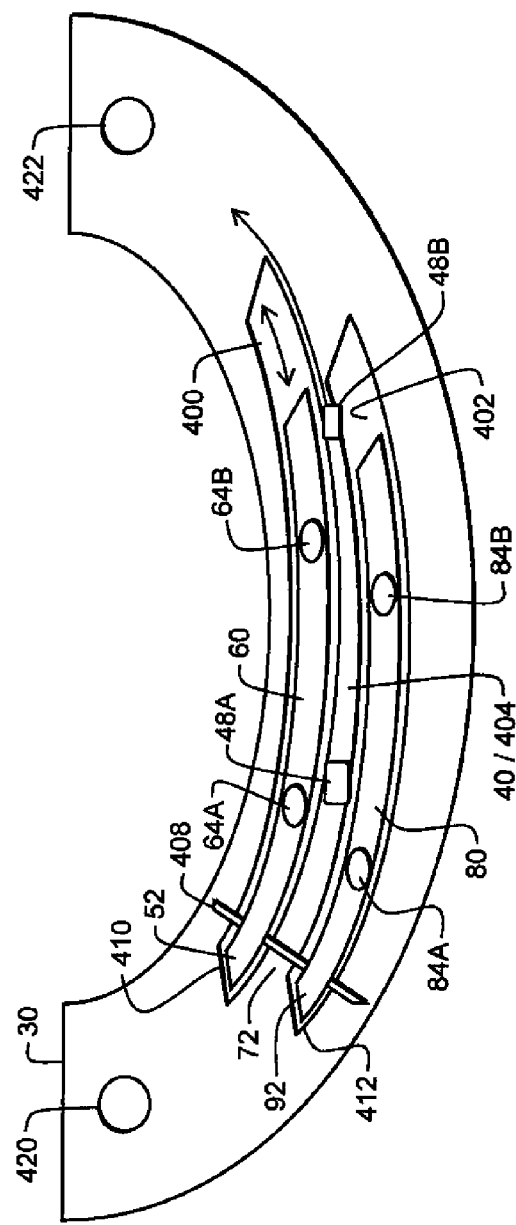

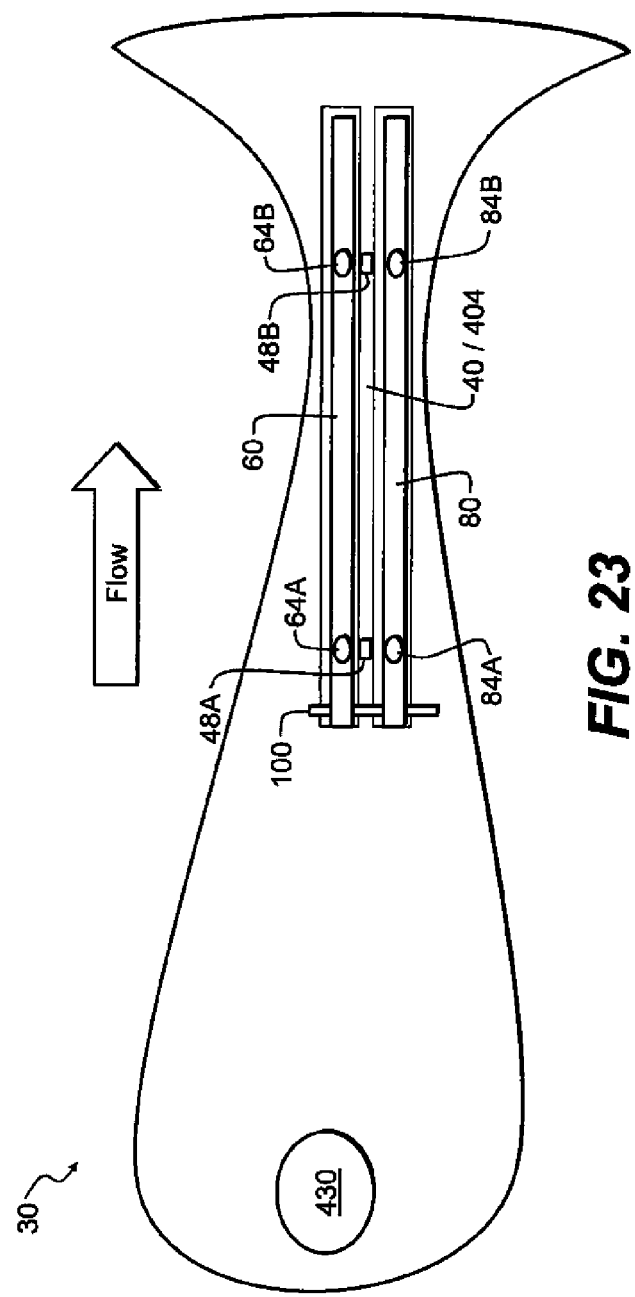

METHOD FOR GENERATING ELECTRICITY

CROSS REFERENCE TO RELATED APPLICATIONS

This application relates to commonly assigned, copending U.S. application Ser. No. 13/599,205, filed Aug. 30, 2012, entitled: "CHANGING RADIUS GENERATOR" which is hereby incorporated by reference.

FIELD OF THE INVENTION

The present invention relates to energy conversion devices and, more particularly to devices that convert kinetic energy in flows of a fluid into electrical energy.

BACKGROUND OF THE INVENTION

It has long been a goal of engineers and scientists to develop more effective methods and apparatuses for harvesting the kinetic energy that is present in naturally occurring flows of wind, water or flows of other material. To accomplish this, windmills and turbines have been developed with blades that are joined around a central hub and shaped so that kinetic energy from a fluid flow against the blades urges the blades to rotate about the hub. The velocity and torque with which the hub rotates provides rotational energy that can then be used for other purposes. In some cases, the rotational energy provided at the hub is supplied directly to mechanical systems that perform work such as milling or pumping water. However, most modern windmills and turbines connect electrical generators to the hub to convert rotational mechanical energy into electrical energy.

The blades used in windmills and turbines spin in a direction that is generally normal to a direction of the fluid flow and can have disruptive effects on the fluid flow and on things carried by the fluid flow. The spinning blades are also subject to static and dynamic balance problems. For example, when dynamic unbalance conditions exist, rotation of the blades urges the hub to rotate about an axis other than predetermined rotational axis of the hub. Mountings such as bearings that are used to position the hub for rotation about the predetermined rotational axis provide reaction forces that resist the urging. This reduces the efficiency of the energy conversion process and causes premature bearing failure which increases maintenance costs. These effects in turn increase the cost of electricity produced by windmills and turbines. Additionally, such reaction forces can create noise and vibration in the windmill or turbine that can have a disruptive effect in the area surrounding the windmill or turbine.

What are needed therefore, are methods and apparatuses that allow for the generation of electrical energy in a manner that is less disruptive to the flow of fluid and to the surrounding environment. What is also needed, are methods and apparatuses that generate energy with lower maintenance requirements.

In some cases, efforts have been made to meet these needs through the use of piezoelectric webs. For example, U.S. Pat. No. 6,424,079 issued to Carroll on Jul. 23, 2002 and entitled: "Energy Harvesting Eel" describes a piezoelectric power generator for use in a fluid flowing stream. This piezoelectric power generator has an elongated flexible central layer of a dielectric material with axially along opposite sides thereof a plurality of separate piezoelectric elements each formed from a portion of a continuous layer of the piezoelectric layer extending along each opposite side of the central layer sandwiched between a pair of electrodes unique to each piezoelectric element. In the '079 patent, the piezoelectric power generator is mounted within a water flow and is allowed to undulate in the presence of turbulent forces in the fluid stream. Repetitive flexures of the piezoelectric elements induce stresses in the piezoelectric materials that the piezoelectric materials convert into electrical energy.

In one embodiment of the '079 patent the flow induces a continuous sine wave shape in the elongated structure including spaced crests and troughs. When this occurs piezoelectric layer on one side of the structure is bent into a convex shape and a dielectric layer on the other side is bent into a concave shape. The concave shaped piezoelectric layer is stressed in tension to create an electrical charge for electrodes in contact with it. Conversely the convex concave shaped piezoelectric layer on the opposite side of the structure is stressed in compression to create an electrical charge for electrodes in contact with it.

Other examples where piezoelectric materials are used to generate energy from a fluid flow include U.S. Pat. No. 4,387,318 issued to Kolm et al. on Jun. 7, 1983, entitled: "Piezoelectric Fluid-Electric Generator" which shows a piezoelectric fluid-electric generator including a piezoelectric bending element, means for mounting the one end of the belt the elements in a fluid system, means for driving the piezoelectric element to oscillate with the energy of a fluid stream and electrode means connected to the piezoelectric ending element to conduct current generated by the oscillatory motion of the piezoelectric bending element. In one embodiment of this type, a paddle like blade extends from one end of the piezoelectric bending element to be deflected by the fluid while the other end is rigidly mounted to a support. Yet another example of a piezoelectric generator is shown in U.S. Pat. No. 7,560,856 issued Jul. 14, 2009. In this patent electrical energy is produced by converting kinetic energy from fluid flow with membranes that generate electrical energy in response to deformation by the fluid flow passing through a piezoelectric medium attached to the deforming membranes. Sets of membranes define variable fluid flow restrictors that oscillate due to interaction of the force of fluid flow and Bernoulli effect.

A variety of performance limitations are associated with such piezoelectric systems. One is that the production of electrical energy requires subjecting the piezoelectric materials to cycles of inducing and relieving stresses in the materials. This can lead to early failure of such piezoelectric materials. Further, there are limits as to the extent to which such piezoelectric materials can generate electricity in response to applied energy.

U.S. Pat. Nos. 7,821,144 and 8,026,619 describe another alternative approach to generating energy from a flow of the fluid that requires neither piezoelectric materials nor spinning blades. Instead, in these cases an energy converter is provided that includes a flexible membrane having at least two fixed ends fixed to a frame. The membrane and frame are arranged in a flow of fluid so that the membrane oscillates when subject to fluid flow. One of an electrical conductor and a magnet is joined to membrane and oscillates with the membrane. The other of the electrical conductor and a magnet is positioned proximate to the path of movement of the membrane and apart therefrom. The oscillation of the membrane caused by the fluid flow causes a relative movement between the electrical conductor and the applied magnetic field inducing a current in the electrical conductor.

Although these systems do not have rotating blades, they require that the membrane oscillates across the path of fluid flow, they create noise and they create vibrations. Accordingly, these systems are also disruptive to the flow of fluid, objects in flow of fluid and to the surrounding environment and have efficiency limits due to the loss of energy to noise and vibration and the requirement that they oscillate in the flow of fluid rather than undulate.

Thus, what are still needed in the art are methods and apparatuses that can generate energy from moving flows of fluid such as wind and water and that can do so with greater efficiency, greater reliability and less disruption of the environment.

SUMMARY OF THE INVENTION

Methods for generating electricity are provided. In one embodiment, a flexible magnetic field source between a first flexible plurality of conductors and a second flexible plurality of conductors is placed in a flow of a material, the flexible magnetic field source, the first flexible plurality of conductors and the second flexible plurality of conductors are held at one end along a length while allowing opposite ends of the flexible magnetic field source, the first flexible plurality of conductors and the second flexible plurality of conductors to move relative to each other along the length and the flexible magnetic field source, the first flexible plurality of conductors and the second flexible plurality of conductors are arranged so that forces provided by the fluid to cause the flexible magnetic field source, the first flexible plurality of conductors, and the second flexible plurality of conductors to bend along the length. The bending changes the radiuses of the flexible magnetic field source, the first flexible plurality of conductors and the second flexible plurality of conductors to move the first plurality of conductors and the second plurality of conductors relative to a magnetic field of the flexible magnetic field source that is different at different portions along the length and to induce a currents in the first plurality of conductors and in the second plurality of conductors.

BRIEF DESCRIPTION OF THE DRAWINGS

FIG. 21 shows a still other embodiment of an electrical generator showing yet another embodiment of a holder in an unbent state.

FIG. 22 shows the embodiment of FIG. 21 in a bent state.

FIG. 23 shows another embodiment of an electrical generator a further embodiment of a holder.

DETAILED DESCRIPTION OF THE INVENTION

Figure 1:
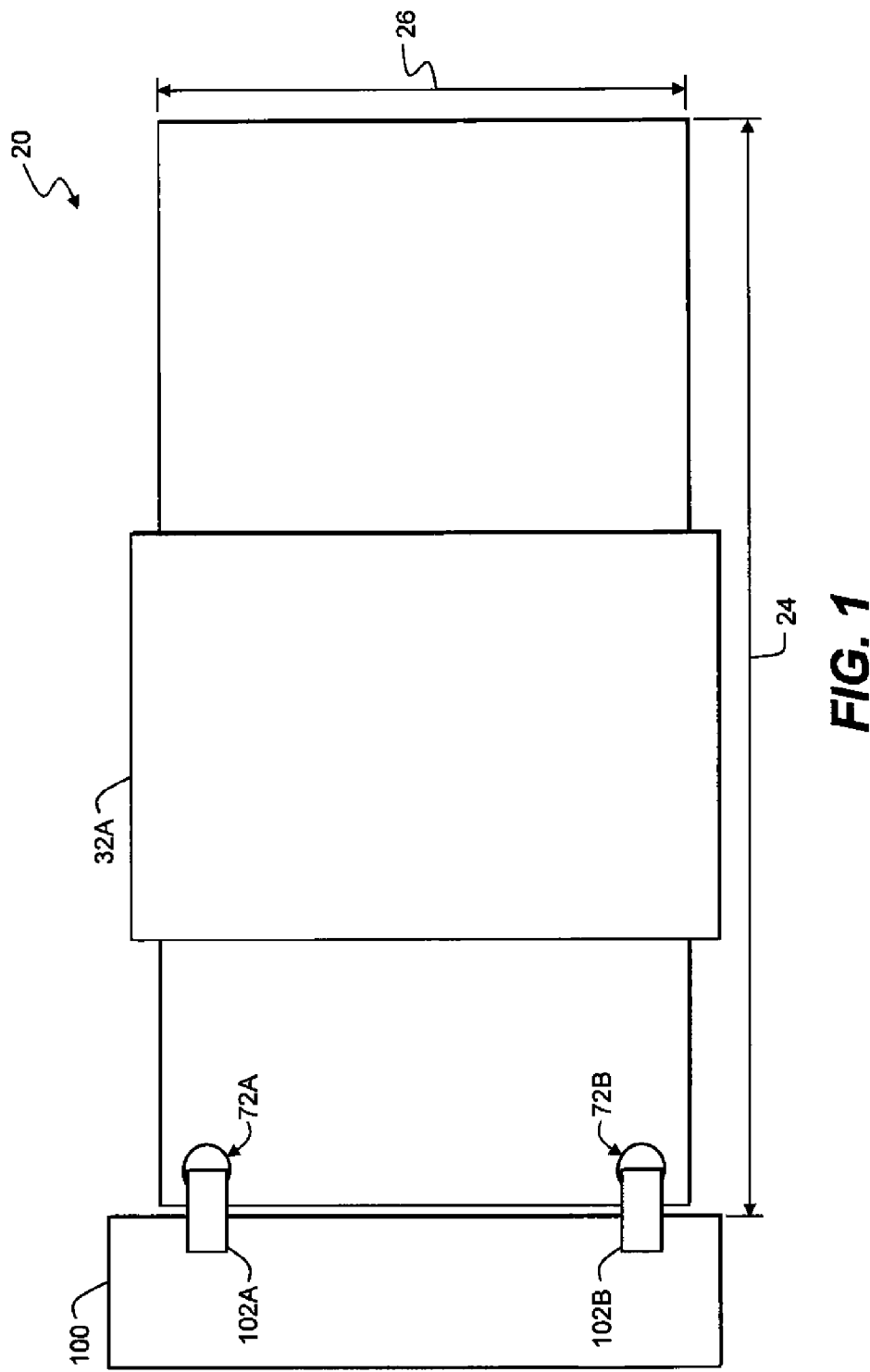
FIG. 1 illustrates a top schematic view of an electrical generator.
Figure 2:
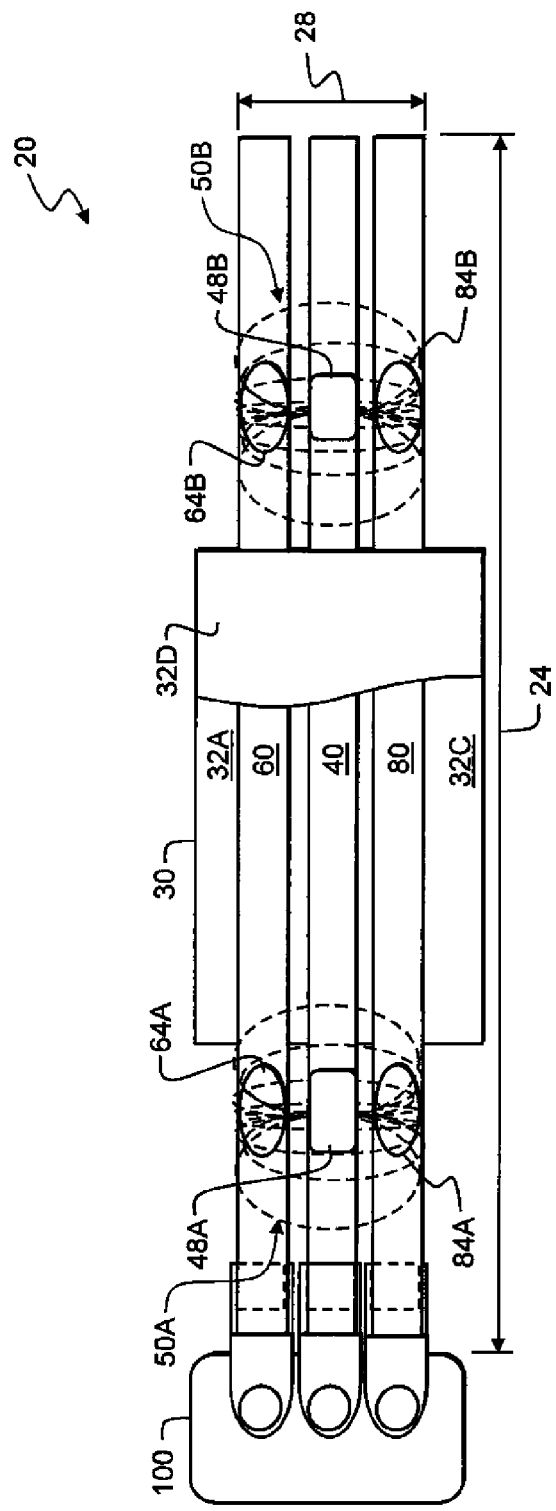
FIG. 2 illustrates a side view of the electrical generator of FIG. 1.

FIG. 1 illustrates a top schematic view and FIG. 2 illustrates a side schematic view of a first embodiment of an electrical generator 20. In the embodiment of FIGS. 1-2, electrical generator 20 has a holder 30 that holds a magnetic field layer 40 between a first layer 60 having a first plurality of conductors 64A and 64B and a second layer 80 having a second plurality of conductors 84A and 84B. Holder 30, magnetic field layer 40, first layer 60 and second layer 80 are defined to allow movement of magnetic field layer 40, first layer 60 and second layer 80 relative to each other along length 24. Holder 30 magnetic field layer 40, first layer 60 and second layer 80 are further defined so that generator 20 can be bent along length 24 by an application a force to generator 20. Holder 30 holds magnetic field layer 40, first layer 60 and second layer 80 in a manner that can slide relative to each other.

Holder 30 also holds magnetic field layer 40, first layer 60 and second layer 80 such that magnetic field layer 40, first layer 60 and second layer 80 can bend along length 24 in response to an applied force.

Figure 3:
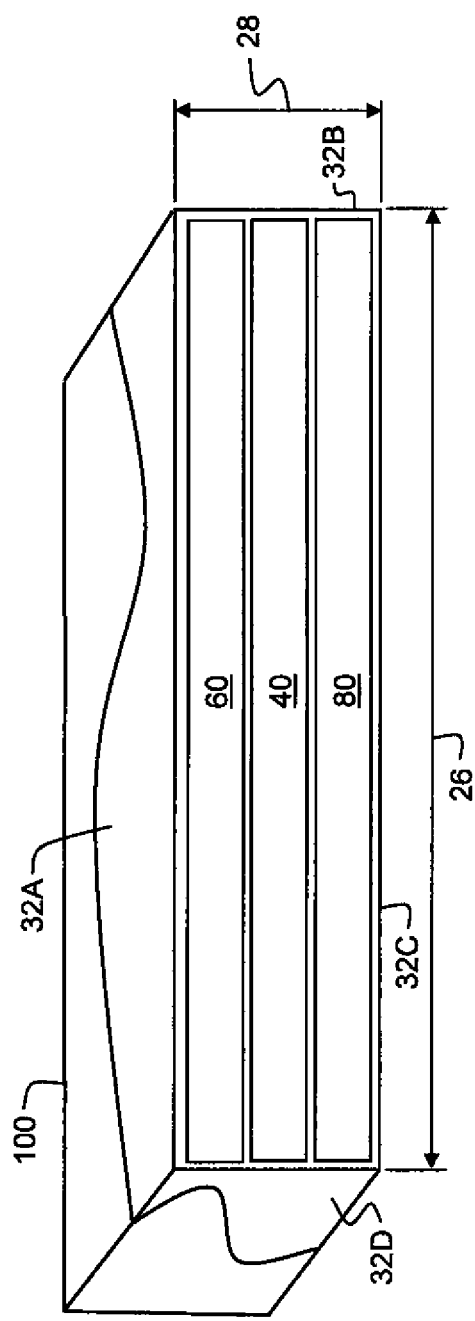
FIG. 3 illustrates an end view of the electrical generator of FIG. 1.

FIG. 3 illustrates an end schematic view of generator 20 of FIGS. 1 and 2. As is shown in FIG. 3, in this embodiment holder 30 uses a plurality of holding surfaces 32A, 32B, 32C and 32D that are positioned around magnetic field layer 40, first layer 60 and second layer 80 along a width 26 and a height 28 of generator 20 to restrict the extent to which magnetic field layer 40, first layer 60, and second layer 80 can separate along width 26 and height 28.

Figure 4:
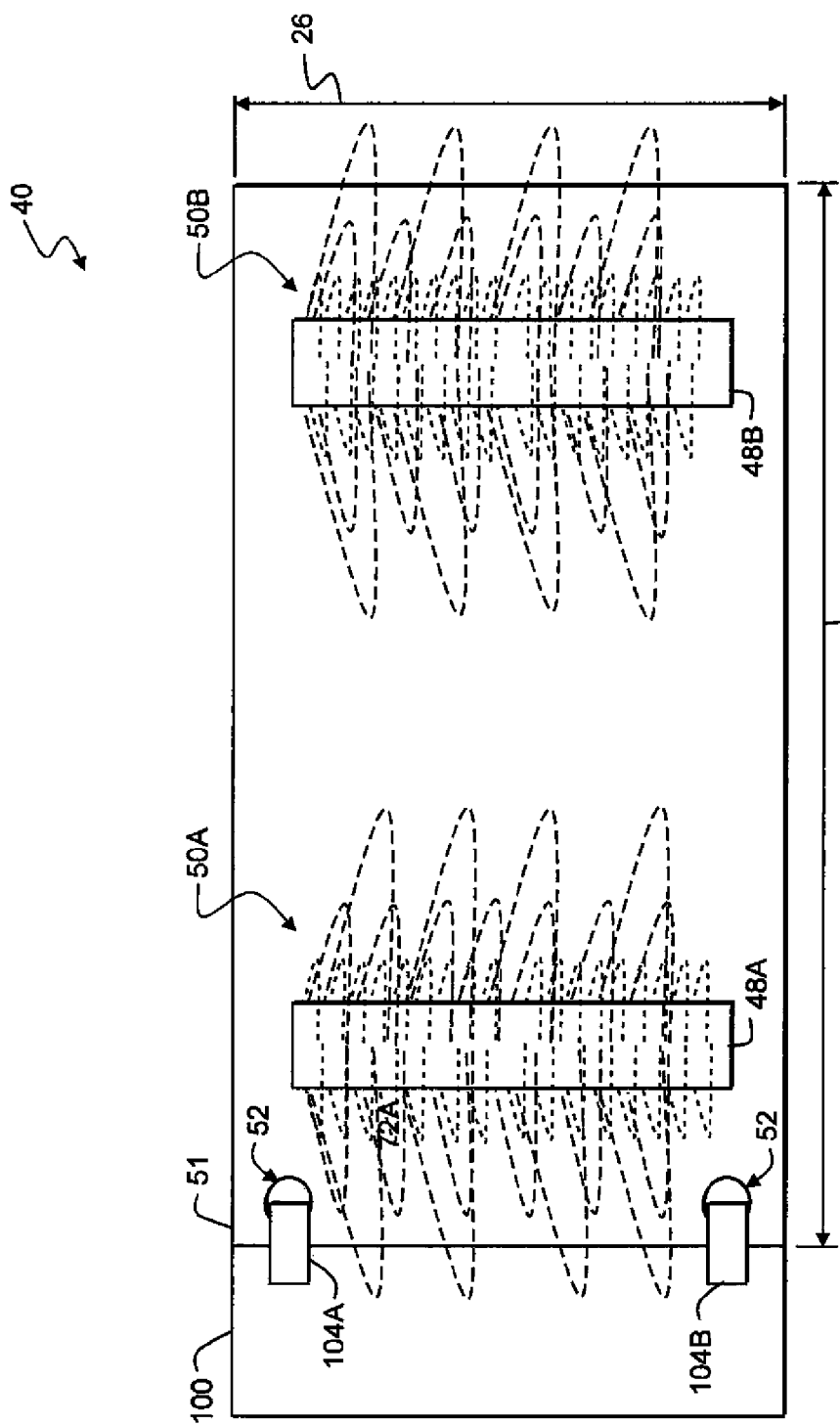
FIG. 4 illustrates a top schematic view of one embodiment of a magnetic field layer of the electrical generator of FIG. 1.

FIG. 4 shows a top schematic view of one embodiment of a magnetic field layer 40 used in the embodiment of FIGS. 1, 2 and 3. In this embodiment, magnetic field layer 40 has a support 42 that extends along length 24 and along width 26 and provides a varying magnetic field along the length axis. In the embodiment illustrated in FIG. 4 the varying magnetic field by means of a plurality of magnetic field sources 48A and 48B are provided at separate locations along length 24. Magnetic field sources 48A and 48B generate a plurality of magnetic fields 50A and 50B illustrated here by field lines. It will be appreciated that all field lines illustrated herein are provided for illustrative purposes and are not intended to represent any particular magnetic field intensities or patterns of intensities unless stated expressly otherwise. In this embodiment, the intensity of the magnetic field(s) proximate to magnetic field layer 40 varies along length 24. In this embodiment, only two magnetic field sources 48A and 48B are shown, however, this is done for the purpose of simplifying the present discussion and this is not limiting.

As is also shown in the embodiment of FIG. 4, magnetic field layer 40 also has a mounting end 51 with mounting areas 52, shown as perforations that are joined by way of linkages 104A and 104B to a mount 100. In other embodiments, mounting areas 52 can be joined to linkages 104A and 104B in any other known manner including but not limited to adhesives and fasteners and in that regard a perforation may or may not be used. Additionally, in a further embodiment, linkages 104A and 104B can be integrally formed from with support 42.

In the embodiment of FIG. 4 magnetic field layer 40 is shown having a sheet configuration to support magnetic field sources 48A and 48B. In this embodiment, support 42 can comprise for example a polymeric or fibrous sheet or web like material on which or in which magnetic field sources 48A and 48B can be provided. In some embodiments, magnetic field sources 48A and 48B will be fabricated with support 42 and in other embodiments magnetic field sources 48A and 48B can be joined to support 42 or formed thereon. In some embodiments, magnetic field sources 48A and 48B can be printed, coated or mass transferred onto support 42. However, in other embodiments magnetic field layer 40 can take any other form that can move and provide magnetic fields as described herein.

In the embodiment of FIG. 4, magnetic field layer 40 uses magnetic field sources 48A and 48B that are in the form of permanent magnets that are positioned at different locations along length 24 of magnetic field layer 40 and that extend generally across width 26 of magnetic field layer 40. Permanent magnet type magnetic field sources 48A and 48B shown here can comprise flat bar magnets but are not limited to any particular shape. In other embodiments, magnetic field sources 48 can comprise electromagnets or other types of magnets can be used.

Given this arrangement an object moving lengthwise along magnetic field layer 40 will experience a range of different magnetic field intensities. When the object is proximate to one of magnetic field sources 48A and 48B, the object will experience greater magnetic field intensity than when the object is more distant from magnetic field sources 48A and 48B.

Figure 5:
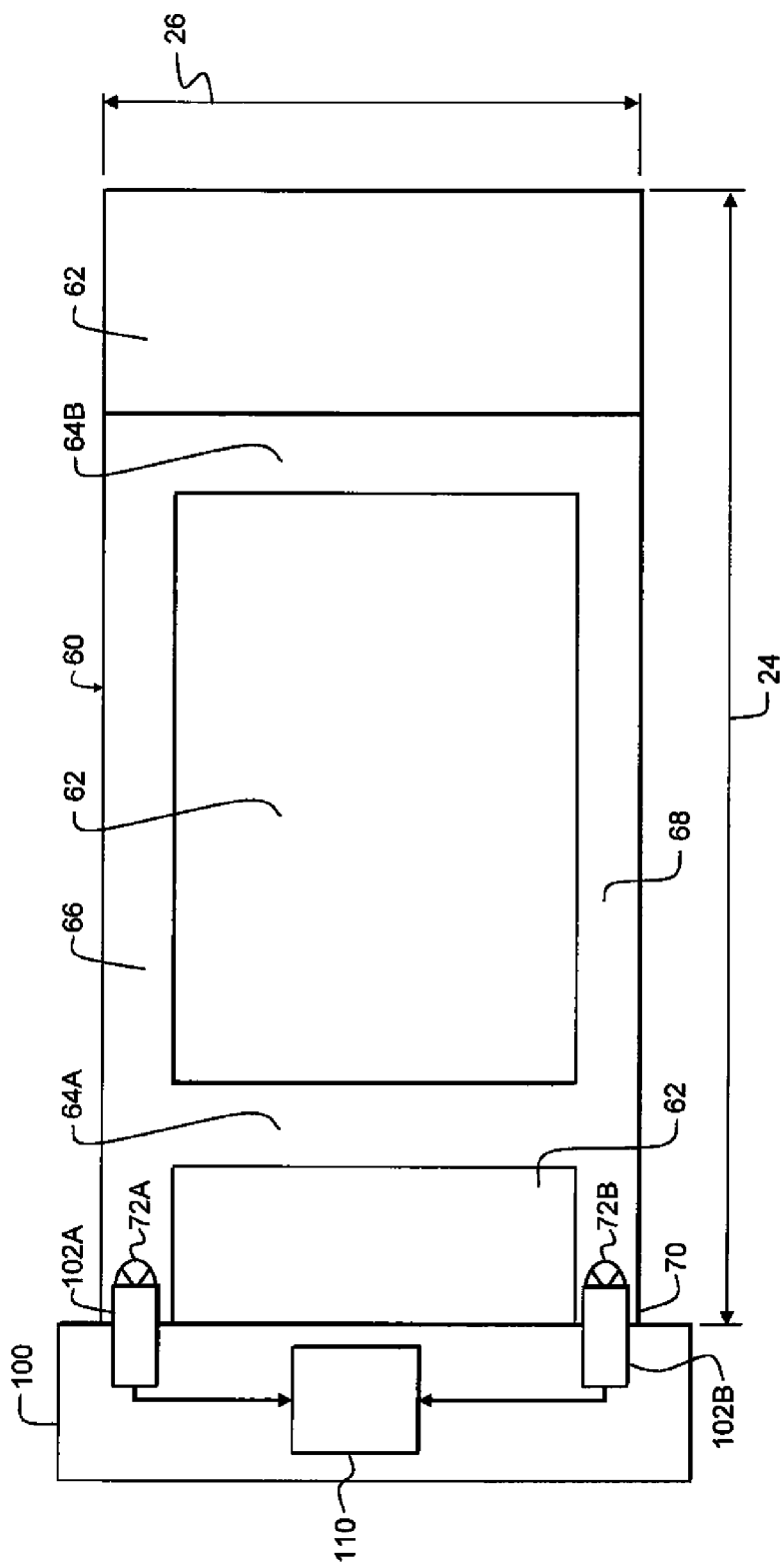
FIG. 5 illustrates a top schematic view of one embodiment of a first layer of the electrical generator of FIG. 1.

FIG. 5 shows a top schematic view of one embodiment of a first layer 60 of electrical generator 20. Here first layer 60 has a support 62 with a first plurality of conductors shown here as conductors 64A and 64B positioned thereon. Conductors 64A and 64B extend generally across width 26 and are positioned at plurality of separate locations along a length 24. In this embodiment, two conductors 64A and 64B are shown, however, this is done for the purpose of simplifying the present discussion and this is not limiting.

As is also shown in FIG. 5, conductors 64A and 64B are connected to a first carrier line 66 and to a second carrier line 68 at mounting areas 72A and 72B. First carrier line 66 leads to a connection 102A on one side of width 26 at a mounting end 70 of first layer 60 and second carrier line 68 leads to a connection 102B on opposite side of width 26 at mounting end 70 of first layer 60. A connector 102A joins a power harvesting circuit 110 to first carrier line 66 and a connector 102B joins power harvesting circuit 110 to second carrier line 68. In this embodiment, connector 102A and connector 102B can also serve to mechanically link first layer 60 to mount 100. In other embodiments, mounting areas 72A and 72B can be joined to connector 102A and connector 102B in any other known manner including but not limited to adhesives and fasteners and in that regard a perforation may or may not be used. In an alternative embodiment either or both of connector 102A and connector 102B can be integrally formed from with support 42.

In the schematic view of FIG. 5 first layer 60 is shown having a sheet configuration to support conductors 64A and 64B. In this embodiment, support 62 can comprise for example a polymeric or fibrous sheet or web like material on which or in which conductors 64A and 64B can be provided. In some embodiments, conductors 64A and 64B will be fabricated with support 62 and in other embodiments, conductors 64A and 64B can be joined to support 62 or formed thereon. In some embodiments, conductors 64A and 64B can be printed, coated or mass transferred onto support 62. However, in other embodiments first layer 60 can take any other form that can move and provide magnetic fields as described herein.

In the embodiment of FIG. 5, first layer 60 uses conductors 64A and 64B that are in the form of patterned arrangements conductive materials such as copper, silver or metals, salts, carbon materials, or other known conductive materials that are positioned at different locations along length 24 and that extend generally across width 26. Conductors 64A and 64B as shown are shown here as generally flat conductors provided on support 62 but are not limited to any particular shape or type.

In the embodiment of FIG. 5, first layer 60 is shown as providing a conductors 64A and 64B that are generally on the same plane, however, first layer 60 can optionally have multiple sub-layers of conductors with insulators therebetween. For example, two separate sub-layers of conductors can be formed on a first side of support 62 and a second side of support 62.

Figure 6:
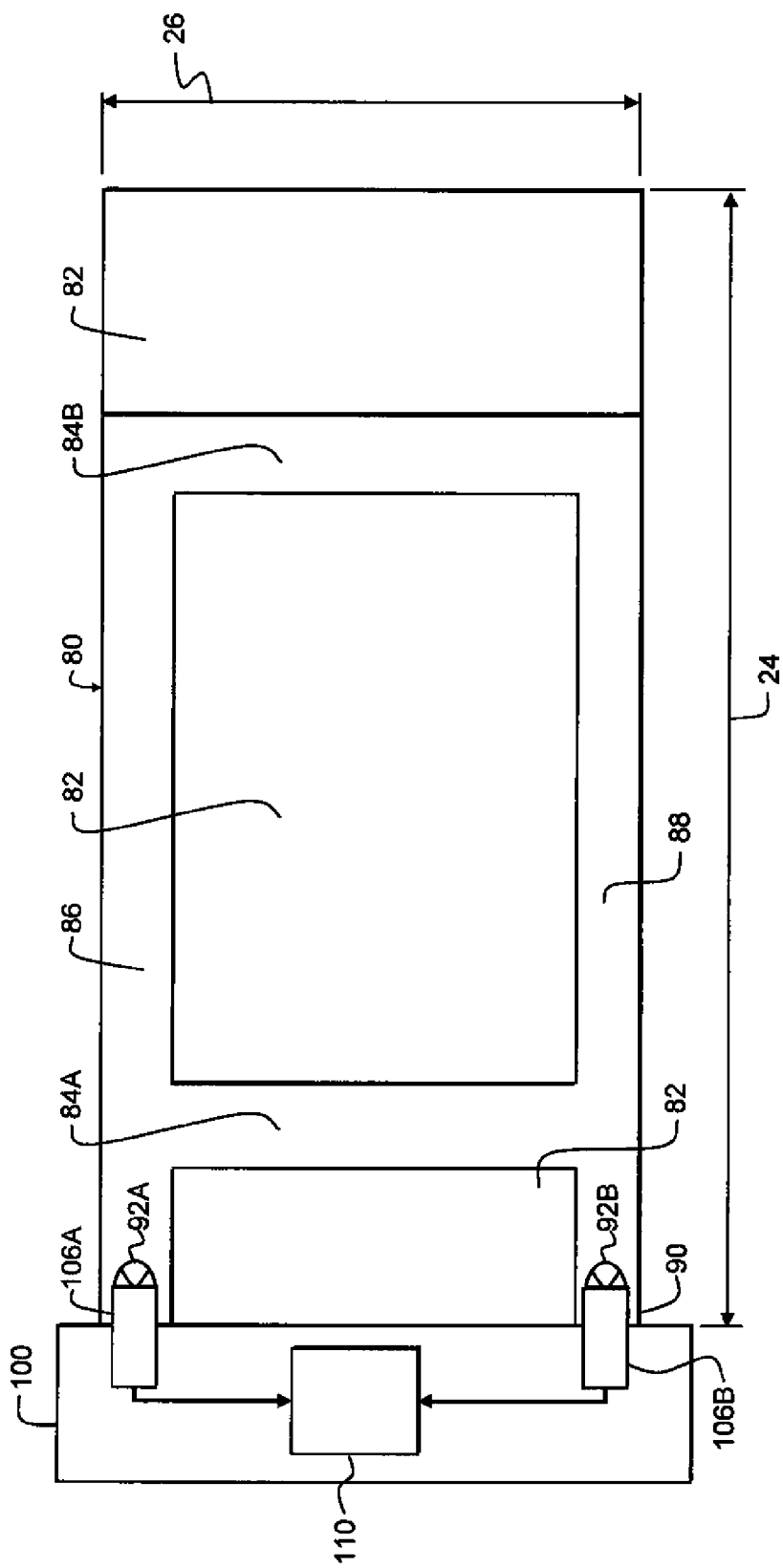
FIG. 6 illustrates a top schematic view of one embodiment of a second layer of the electrical generator of FIG. 1.

FIG. 6 shows a top schematic view of one embodiment of a second layer 80 of electrical generator 20. Here second layer 80 has a support 82 with a second plurality of conductors shown here as conductors 84A and 84B positioned thereon. Conductors 84A and 84B extend generally across width 26 and are positioned at plurality of separate locations along a length of 24. In this embodiment, two conductors 84A and 84B are shown, however, this is done for the purpose of simplifying the present discussion and this is not limiting.

As is also shown in this embodiment, conductors 84A and 84B are connected to a first carrier line 86 and to a second carrier line 88. Second carrier line 88 leads to a connection 92A on one side of width 26 at a mounting end 90 of second layer 80 and second carrier line 88 leads to a connection 92B on opposite side of width 26 at mounting end 90 of second layer 80. A connector 106A joins a power harvesting circuit 110 to first carrier line 86 and a connector 106B joins power harvesting circuit 110 to second carrier line 88. In this embodiment, connector 106A and connector 106B also optionally serve to mechanically link second layer 80 to mount 100. In other embodiments, mounting areas 92 can be joined to connector 106A and connector 106B in any other known manner including but not limited to adhesives and fasteners and in that regard a perforation may or may not be used. In an alternative embodiment either or both of connector 106A and connector 108B can be integrally formed from with support 42.

In the embodiment of FIG. 6, second layer 80 is shown having a sheet configuration to support conductors 84A and 84B. In this embodiment, support 82 can comprise for example a polymeric or fibrous sheet or web like material on which or in which conductors 84A and 84B can be provided. In some embodiments, conductors 84A and 84B will be fabricated with support 82 and in other embodiments conductors 84A and 84B can be joined to support 82 or formed thereon.

In some embodiments, conductors 84A and 84B can be printed, coated or mass transferred onto support 82. However, in other embodiments second layer 80 can take any other form that can move and provide magnetic fields as described herein.

In the embodiment of FIG. 6, second layer 80 uses conductors 84A and 84B that are in the form of patterned arrangements conductive materials such as copper, silver or metals, salts, carbon materials, or other known conductive materials that are positioned at different locations along length 44 of second layer 80 and that extend generally across width 26 of second layer 80. Conductors 84A and 84B are shown here as generally flat conductors provided on support 82 but are not limited to any particular shape or type.

In the embodiment of FIG. 6, second layer 80 is shown as providing a single set of conductors, however, second layer 80 can optionally have multiple sub-layers of conductors with insulators therebetween.

Any or all of magnetic field layer 40, first layer 60 and second layer 80 can have protective or lubricating layers or coating of materials provided thereon to protect supports 42, 62 and 82, conductors 64A, 64B, 84A and 84B and magnetic field sources 48 from environmental, mechanical or thermal damage or to enhance or to otherwise control mechanical properties, electrical properties, or sensitivity to environmental stimuli.

Figure 7:
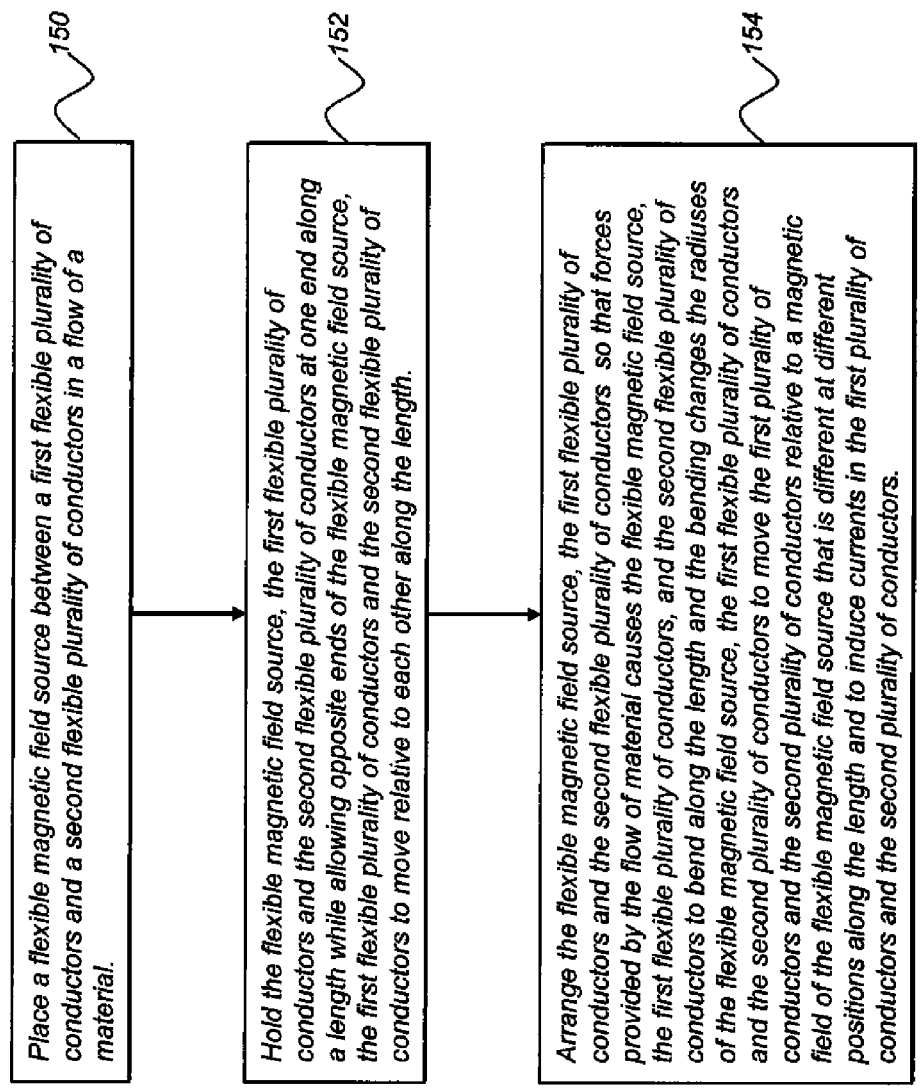
FIG. 7 illustrates one embodiment of a method for generating energy.

FIG. 7 illustrates one embodiment of a method for generating electricity that can be executed for example and without limitation using the electrical generator 20 of FIGS. 1-6. In the method of FIG. 7, a flexible magnetic field source is placed between a first flexible plurality of conductors and a second flexible plurality of conductors in a flow of a material (step 150). In one embodiment this can done by assembling an electrical generator 20 that has a magnetic field layer 40, first layer 60 and second layer 80 as is shown and described with reference to in FIGS. 1-6 and placing the assembled electrical generator 20 in a flow of a material such as a liquid, solid or a gas. In other embodiments, these components can be assembled in the flow or in or near an area where the flow will pass.

The first flexible array of conductors, the second flexible array of conductors and the flexible magnetic field source are then held at one end along a length but moveable relative to each other at an opposite end such that forces provided by the fluid cause the flexible magnetic field source, the first flexible plurality of conductors, and the second flexible plurality of conductors to bend along the length (step 152). Here too one embodiment this can be done by assembling an electrical generator 20 that has a magnetic field layer 40, first layer 60 and second layer 80 that are held together at mounting ends thereof as is shown in FIGS. 1-6 and placing the assembled electrical generator 20 in a flow of a material such as a liquid, solid or a gas. In other embodiments, the holding can be accomplished by joining or otherwise fixing the locations one lengthwise edge of the flexible magnetic field source, the first plurality of conductors and the second plurality of conductors in the flow or in or near an area where the flow will pass.

The flexible magnetic field source, the first plurality of conductors and the second plurality of conductors are arranged in the flow material so that any forces provided by the fluid to cause the flexible magnetic field source, the first flexible plurality of conductors, and the second flexible plurality of conductors to bend along the length (step 154) This can be done for example by orienting the flexible magnetic field source, the first plurality of conductors and the second plurality of conductors in the flow so that forces from the flow tend to vary in ways that will bend the flexible magnetic field source, the first plurality of conductors and the second plurality of conductors along the length. As will be described in greater detail below, this can also be done by providing supports or other structures that cooperate with for example electrical generator 20 to urge bending movement of flexible magnetic field source, the first plurality of conductors and the second plurality of conductors along length 24 shown in FIGS. 1-6.

Figure 8:
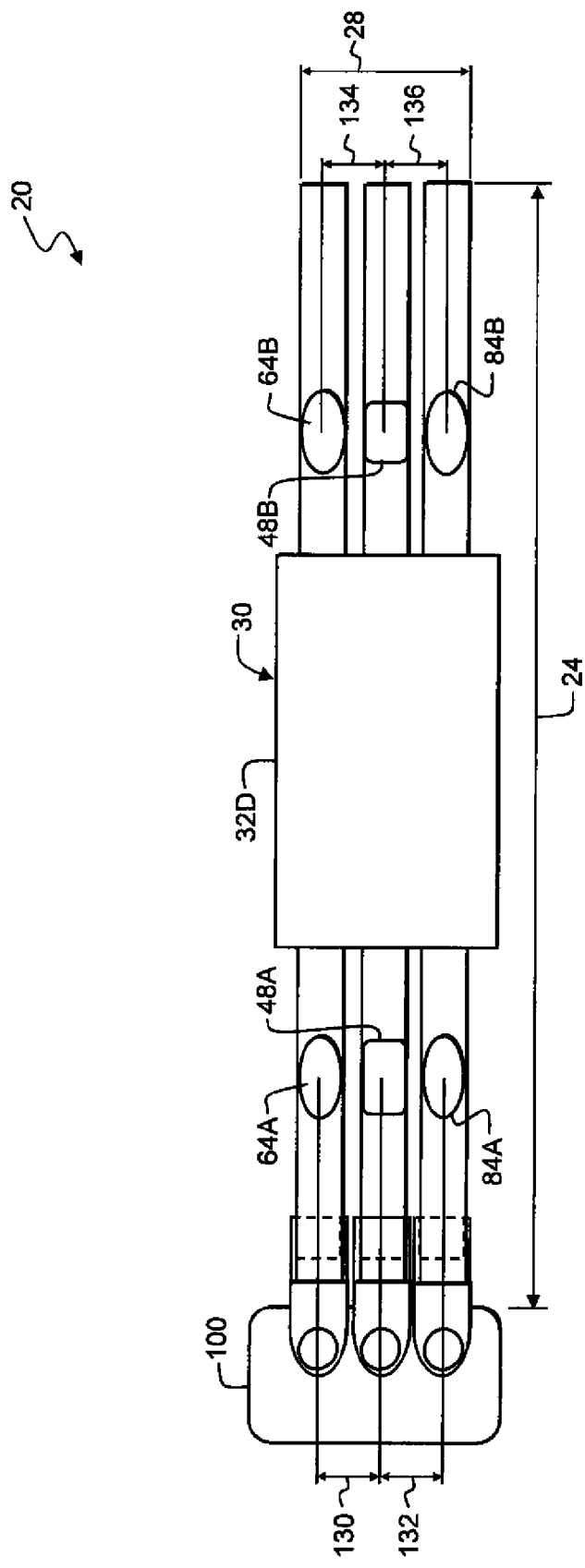
FIG. 8 illustrates a side schematic view of an electrical generator in an unbent state.
Figure 9:
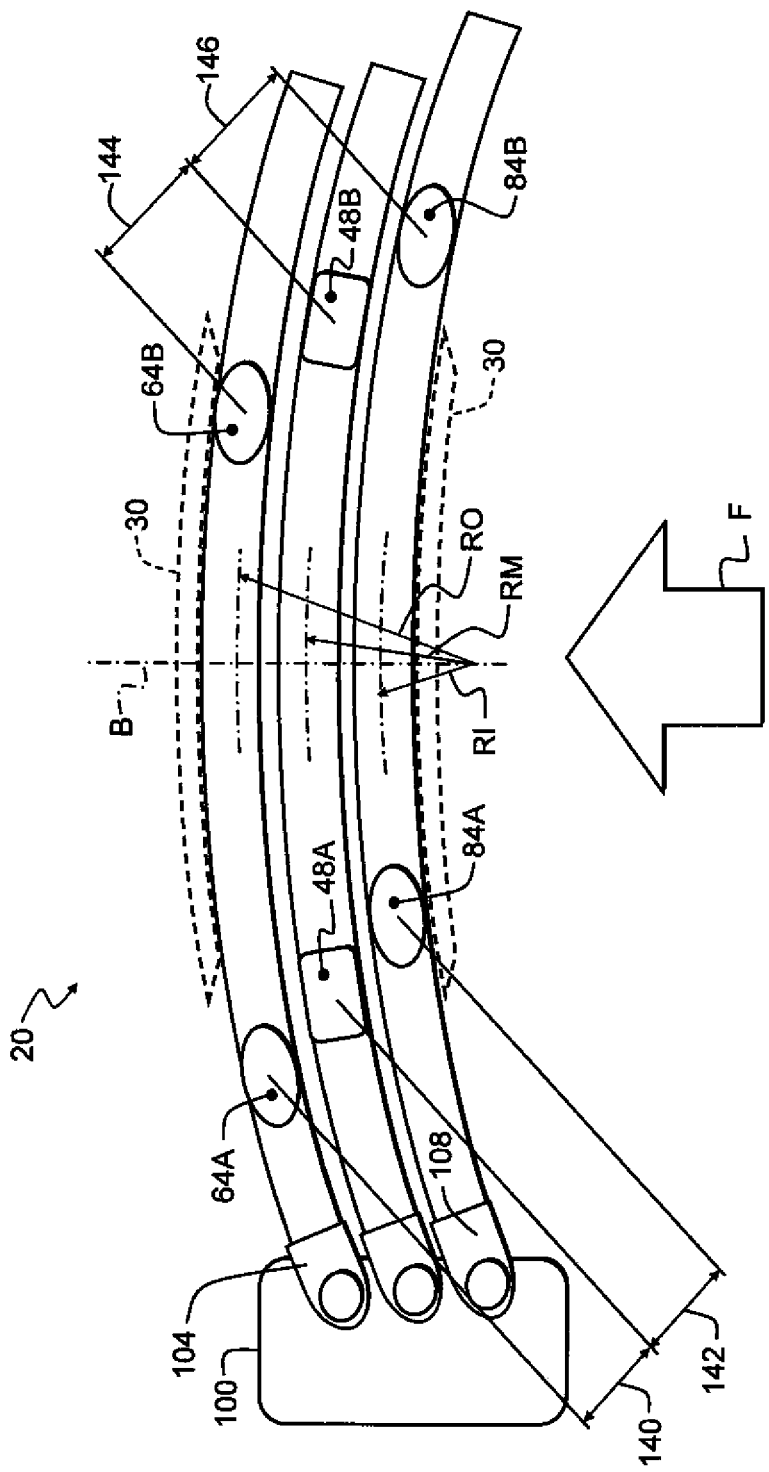
FIG. 9 illustrates a side schematic view of an electrical generator in a bent state.

FIGS. 8 and 9 describe in detail how this bending of the flexible magnetic field source, the first plurality of conductors and the second plurality of conductors is used to create electrical energy.

FIG. 8 shows another side schematic view of generator 20 in an unbent state. As is shown in FIG. 8, in the unbent state, conductor 64A is aligned with and is separated from magnetic field source 48A by a first distance 130 and conductor 84A is aligned with and is separated from magnetic field source 48A by a second distance 132. As is also shown in FIG. 8, conductor 64B is aligned with magnetic field source 48B and is separated therefrom by a third distance 134 while conductor 84B is aligned with magnetic field source 48B and is separated therefrom by a fourth distance 136.

FIG. 9 shows a side schematic view of generator 20 (with holder 30 in phantom) after a kinetic energy in the form of a force F has been applied to generator 20 to cause a bend in generator 20. As is illustrated in FIG. 9, second layer 80 bends at an inside bending radius RI, while magnetic field layer 40 bends at a middle bending radius RM that is greater than inside bending radius RI and first layer 60 has an outside bending radius RO that is greater than middle bending radius RM.

Accordingly, magnetic field layer 40 will have a longer path of travel from mount 100 around bend than second layer 80. This shifts conductor 84A away from magnetic field source 48A by a first vector 142 and also shifts conductor 84B away from magnetic field source 48B by a second vector 146. Similarly, first layer 60 will have a longer path of travel from mount 100 around bend B than magnetic field layer 40. This causes conductor 64A to be separated from magnetic field source 48A by a third vector 140 and causes conductor 64B to be separated from magnetic field source 48B by a fourth vector 144. As is shown in FIG. 8 second vector 146 and fourth vector 144 are greater than first vector 142 and third vector 148 respectively. This difference is caused by the accumulated differences in circumference.

These displacements cause conductors 64A and 64B and conductors 84A and 84B to move from a position where magnetic field intensity is high as shown in FIG. 7 to a position of lower magnetic field intensity as shown in FIG. 8. Such movement induces an electrical current in conductors 64A and 64B and in conductors 84A and 84B in proportion to the extent to which the field intensity to which the conductors move changes. As is shown in FIG. 8 conductors 64A and 84A are closer to magnetic field source 48A than conductors 64B and 84B are to magnetic field source 48B after bending of generator 20. This in turn, causes conductors 64B and 84B to experience a greater change in the intensity of the magnetic field to which they are subjected than is experienced by conductors 64A and 84A and to generate more electrical energy.

It will be appreciated that such effects occur in reverse fashion when generator 20 is caused to revert to a non-bent state and/or to reverse a direction of bending and it will be appreciated that when this occurs the flow of current will be reversed.

As was shown in FIGS. 5 and 6, a power harvesting circuit 110 is provided to receive the electrical energy that is generated. Power harvesting circuit 110 can comprise for example a rectifier circuit. The rectifier circuit can comprise, for example, a bridge rectifier that converts an alternating flow of current into a direct current that can, for example, be used to provide power to a storage device or that can be immediately used. A wide variety of conventional rectifiers can be used for this purpose. Various well known energy storage devices can be used including but not limited to a battery or capacitor or any other known circuit or electrical component that can be used store electric energy in a form that can be used later. In an alternative embodiment, power harvesting circuit 110 can include circuits or systems that use electrical energy or that supply electrical energy to an electrical energy grid or other electrical transmission system.

Figure 10:
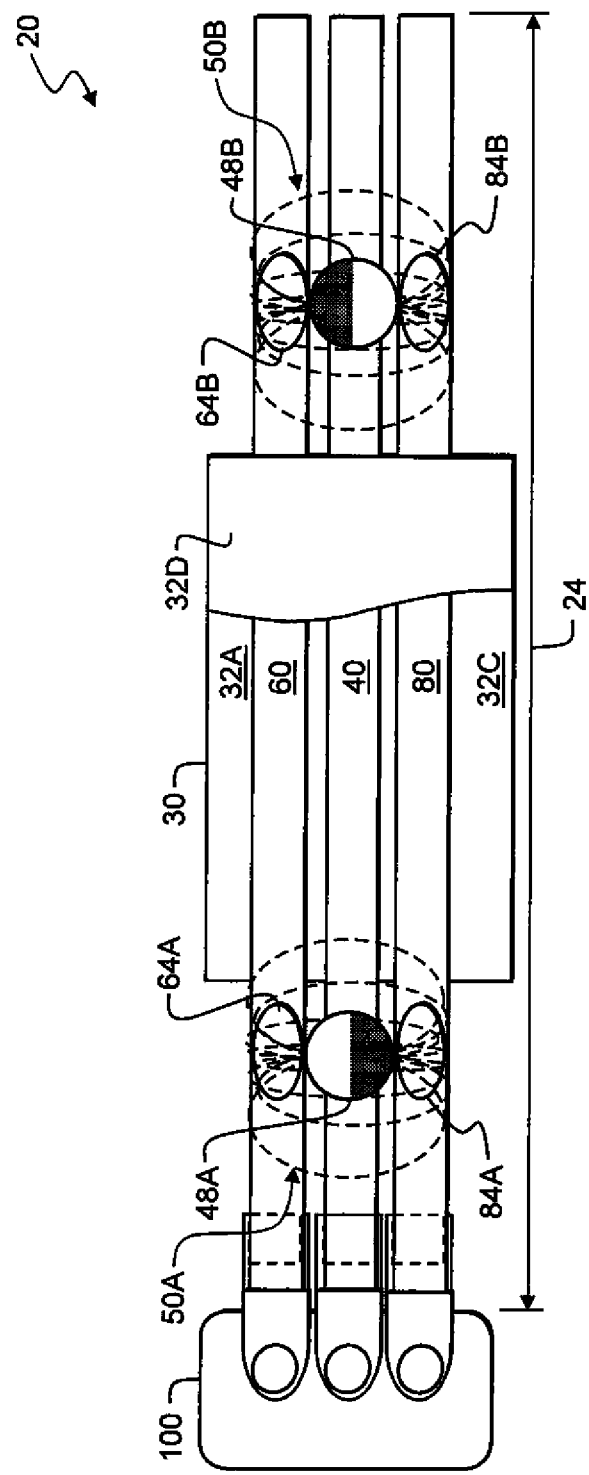
FIG. 10 illustrates another embodiment of an electrical generator.

FIG. 10 illustrates another embodiment of generator 20 where the magnetic field sources 48A and 48B take the form of magnetic rollers. In this embodiment, roller type magnetic field sources 48A and 48B have different magnetic poles illustrated here as light and dark hemispheres. When generator 20 is bent, roller type magnetic field sources 48A and 48B 48A and 48B reduce the friction between first layer 60, second layer 80 and magnetic field layer 40. This reduces energy losses and helps to extend the life of generator 20. Optionally, this can also be used to reorient the magnetic fields 50A and 50B generated by magnetic field sources 48A and 48B during rolling which can have the effect of increasing the extent to which conductors 64A, 64B, 84A and 84B experience a change in magnetic field strength during bending and increasing the electrical current in conductors 64A, 64B, 84A and 84B. In this embodiment magnetic field layer 40 holds roller type magnetic field sources 48A and 48B at a generally fixed separation along length 24 and enable rotation of roller type magnetic field sources 48A and 48B to reorient magnetic fields 50A and 50B. The diameter of the rollers could be varied to impact the radii differences between magnetic field layer 40, first layer 60 and second layer 80 and will impact the relative shift between magnetic field layer 40, first layer 60 and second layer 80. Roller type magnetic field sources 48A and 48B can alternatively be designed or composed of multiple fields/magnets and can provide more than two magnetic poles.

Figure 11:
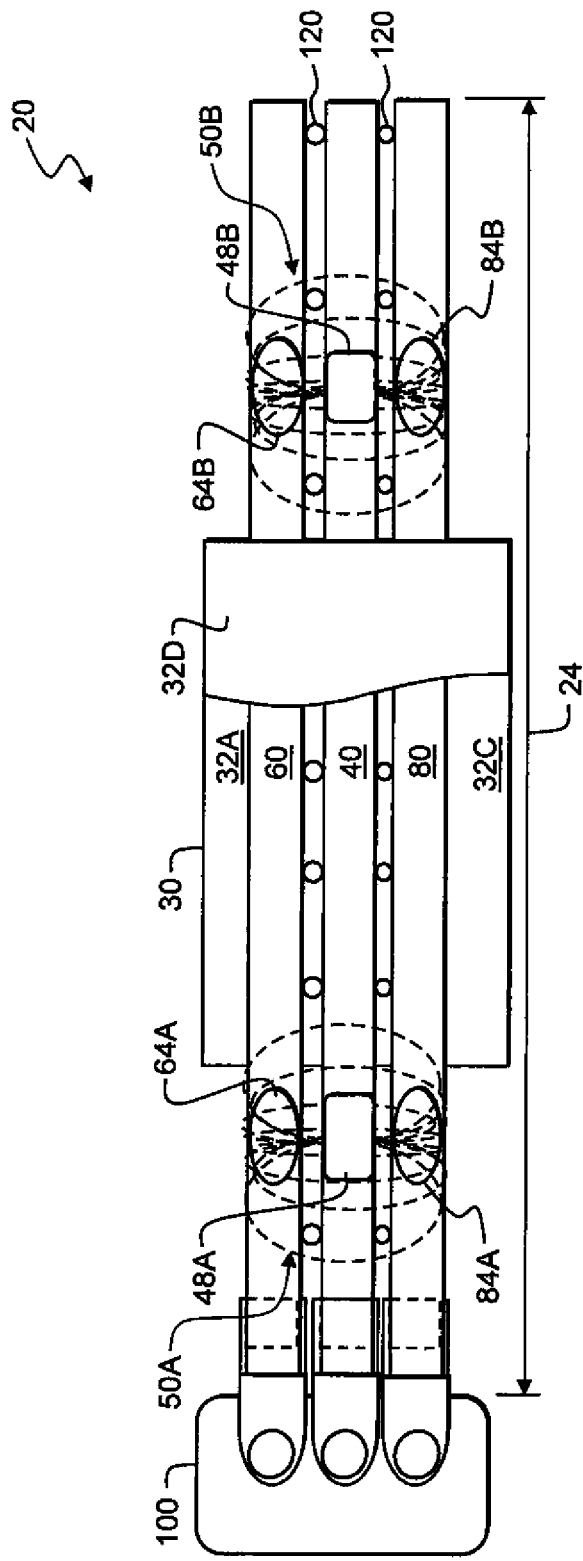
FIG. 11 illustrates another embodiment of an electrical generator.

FIG. 11 illustrates yet another embodiment of generator 20. In this embodiment, separation layers 120 are provided between magnetic field layer 40 and first layer 60 and between magnetic field layer 40 and second layer 80. Separation layers 120 can be used for any of a variety of purposes. In one embodiment, separation layers can be used to maintain consistent desired distance between magnetic field layer 40, first layer 60 and second layer 80. This can be useful to limit the extent to which magnetic field layer 40, first layer 60 and second layer 80 separate and to allow magnetic field layer 40, first layer 60 and second layer 80 to move along length 24 with relation to one another. Separation layers 120 can be used to provide friction reducing materials, coolants, or magnetic field conducting materials and/or magnetic field blocking materials between magnetic field layer 40, first layer 60 and second layer 80. Separation layers 120 can be fabricated with or provided on magnetic field layer 40, first layer 60 and second layer 80. Examples of magnetic field conducting materials and magnetic field blocking materials will be described in greater detail below in reference to FIG. 12. In other embodiments separation layers 120 can be formed as part of holder 30. In still other embodiments, material forming separation layers 120 can be interposed between magnetic field layer 40, first layer 60 and second layer 80 during assembly of generator 20 or afterward.

Figure 12:
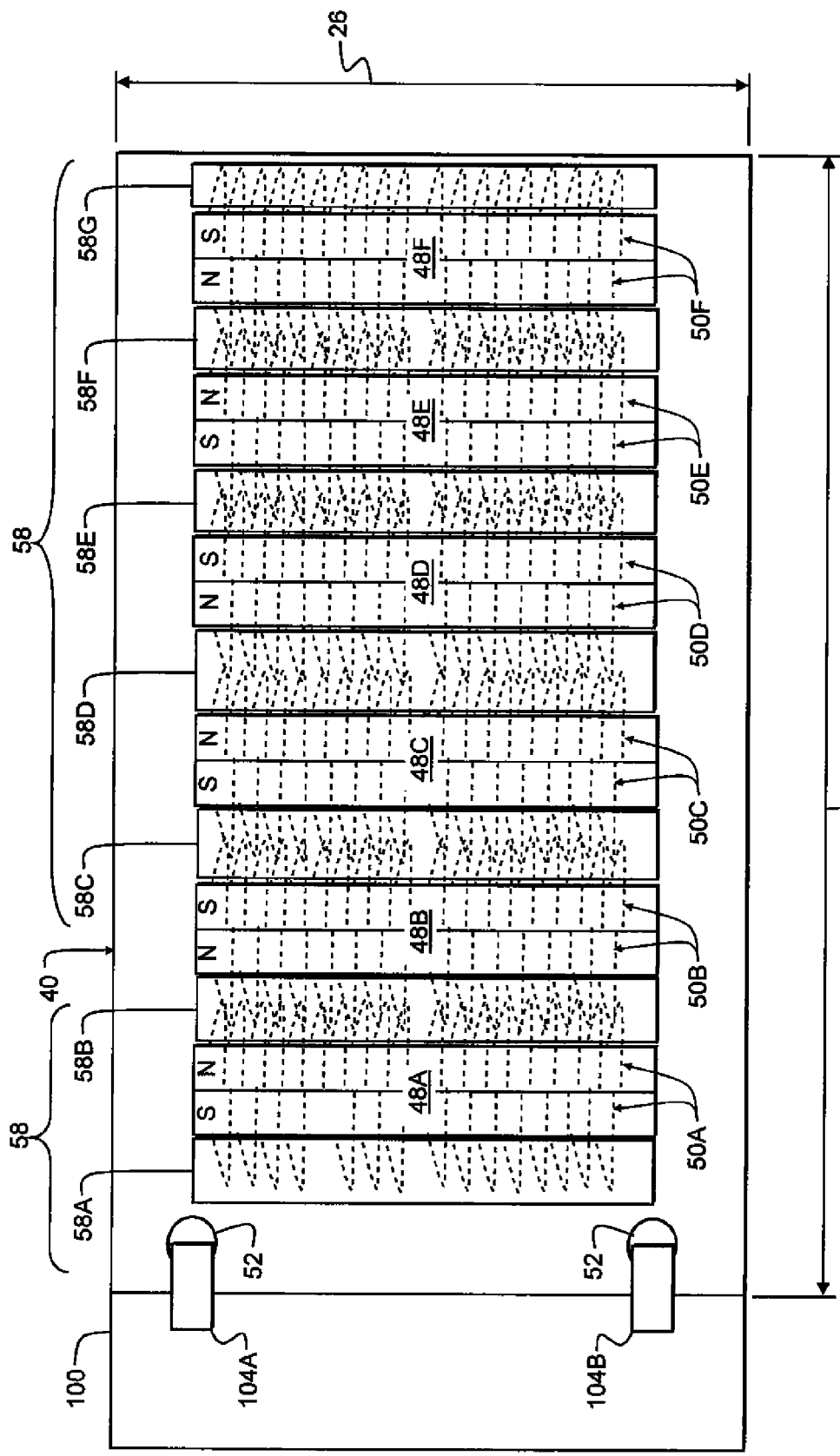
FIG. 12 illustrates another embodiment of a magnetic field sheet.

FIG. 12 illustrates another embodiment of magnetic field layer 40 with a plurality of magnetic field sources 48A through 48F generating a plurality of magnetic fields 50A-50F. As is shown in FIG. 12, a plurality of magnetic field conductors 58A-58G are provided with one of magnetic conductors 58A-58G being adjacent to and between magnetic field sources 48A-48F. Magnetic field conductors 58A-58G comprise materials such as ferromagnetic metals or other materials that interact with magnetic fields 50A-50F and that have the effect of focusing the intensity of the magnetic fields 50A-50F. Magnetic conductors 58A-58G could be any magnetic field conducting material like but not limited to ferromagnetic materials such as iron, copper, steel and the like and ferromagnetic materials such as oxides of iron combined with one or more of the transition metals such as manganese, nickel or zinc, e.g. $MnFe_2O_4$ and can include permanent ferrimagnets that include barium.

In the embodiment that is illustrated in FIG. 12, magnetic field source 48A is arranged so that a north pole of magnetic field source 48A confronts magnetic field source 48B that is arranged with a north pole thereof confronting the north pole of magnetic field source 48A. These fields interact in the presence of magnetic field conductor 58B to create a high intensity area of magnetic north polarity. Conversely, magnetic field source 48B is arranged so that a south pole of magnetic field source 48B confronts a magnetic field source 48C that is arranged with a south pole thereof confronting the south pole of magnetic field source 48B. These fields interact in the presence of magnetic field conductor 58C to create a high intensity area of magnetic south polarity. In this way, a conductor passing from an area proximate magnetic conductor 58B to an area that is proximate to magnetic conductor 58C will experience a change magnetic field from a high intensity north pole to a high intensity south pole. This will induce a substantial amount of current flow in such a conductor.

In the embodiment of FIG. 12, magnetic conductors 58 are shown on first layer 60 in the form of patterned arrangements ferromagnetic materials, ferrimagnetic materials or other magnetically conductive materials. Magnetic conductors 58 are positioned at different locations along length 24 and that extend generally across width 26. Conductors 84A and 84B as shown are shown here as generally flat conductors provided on support 82 but are not limited to any particular shape or type.

Figure 13:
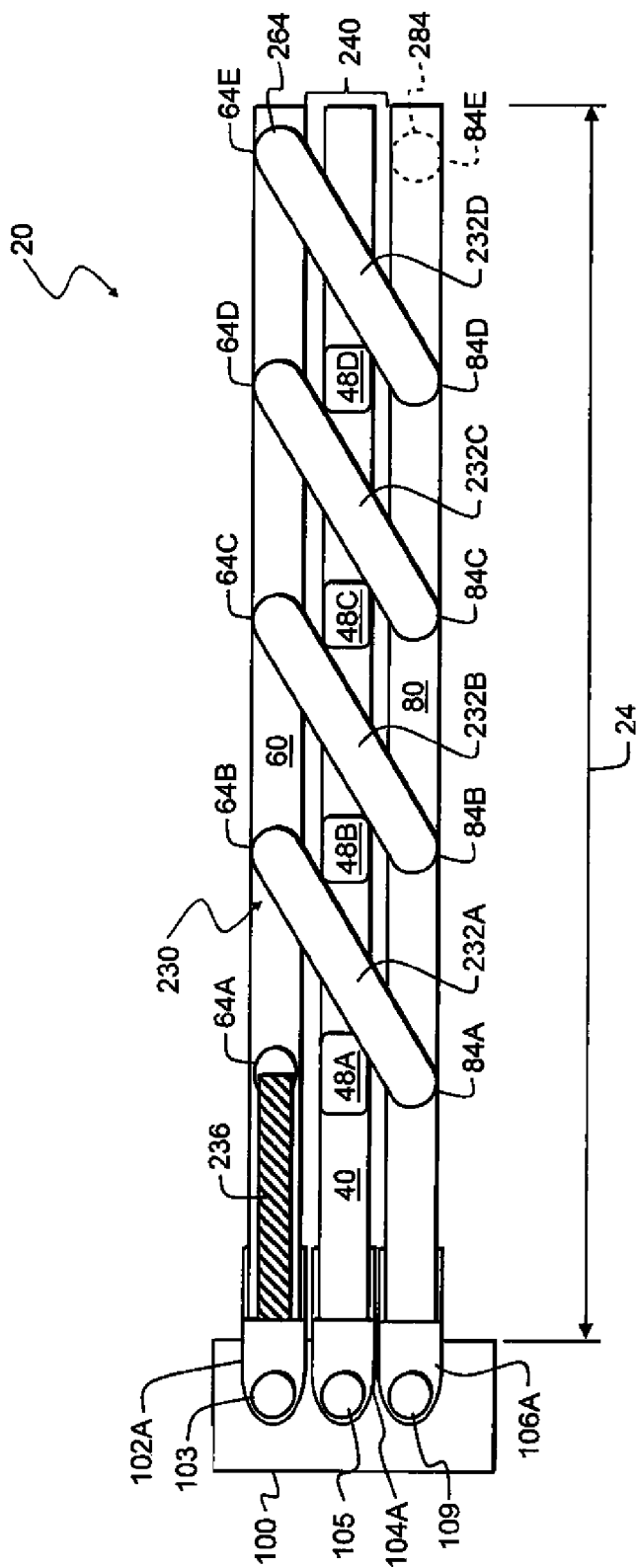
FIG. 13 shows a side view of another embodiment of an electrical generator.
Figure 14:
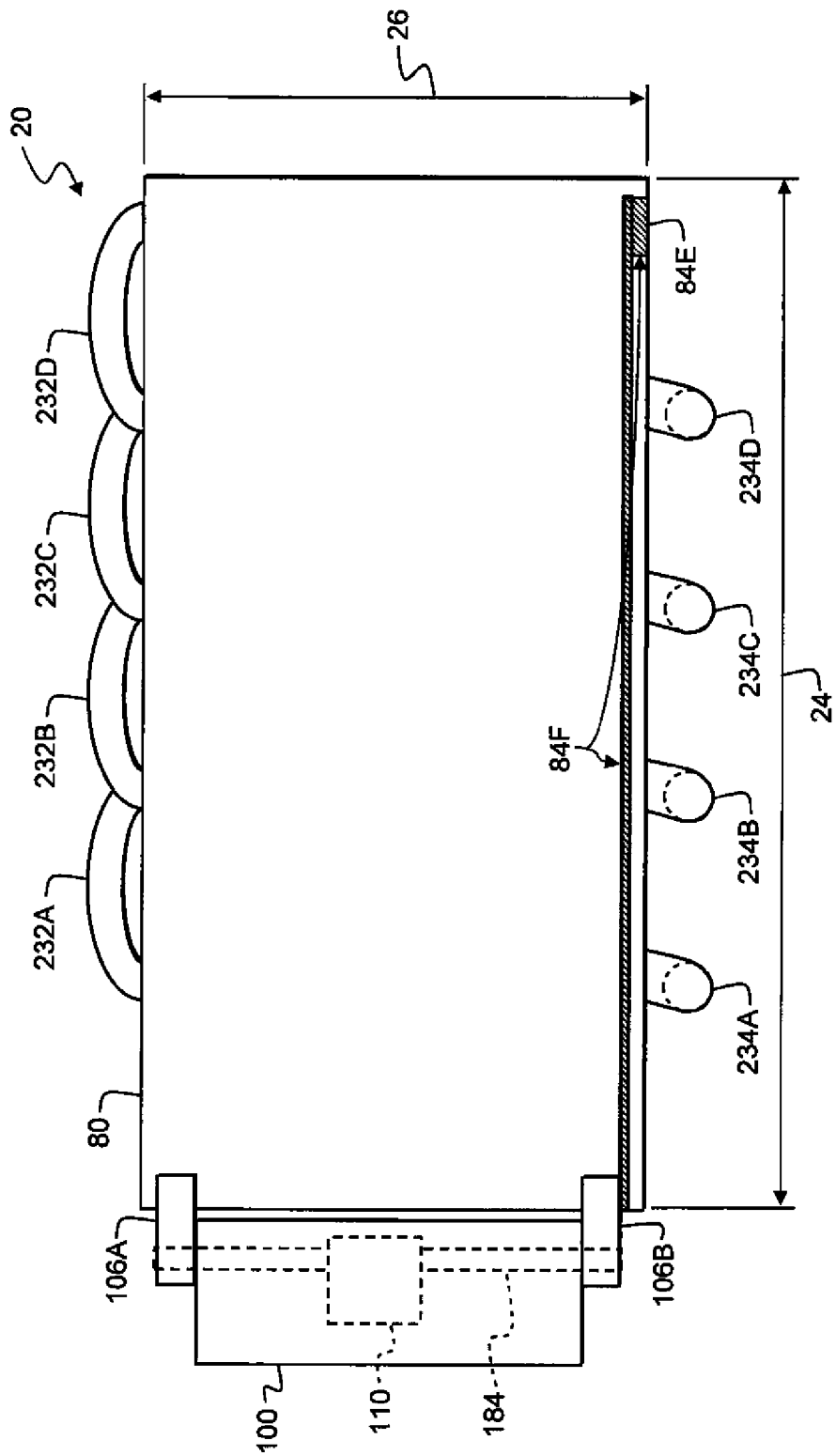
FIG. 14 shows a bottom view of the embodiment shown in FIG. 13.

FIGS. 13 and 14 show, respectively, a side and bottom view of another alternate embodiment of electrical generator 20. As is shown in FIG. 13, a first plurality of conductors 64A-64E and second plurality of conductors 84A-84E comprise, respectively, a first portion of a coil 230. Coil 230 is wound to create an area 240 in which magnetic field layer 40 can be positioned for bending and sliding movement move relative to coil 230. First portions 264 of coil 230 extend across a first side of magnetic field layer 40 and second portions 284 of coil 230 extend across a second side of magnetic field layer 40. In this embodiment first portions 264 form conductors 64A-64E and second portions 284 form conductors 84A-84E.

Coil 230 provides a first connection point 103 to mount 100 for coil starting at connector 102A and a conductor illustrated here as conductor 236 extends from connector 102A along length 24 and then turns to run parallel to magnetic field source 48A across a width 26 to form conductor 64A. Coil 230 then forms a crossover 234A that crosses over from first layer 60 to second layer 80 and extends across width 26 parallel to magnetic field source 48A to form conductor 84A. Coil 230 then forms loop 232A and returns to first layer 60 to form conductor 64B. This looping arrangement continues in like fashion to form a crossover 234B, followed by a conductor 84B, loop 232B, conductor 64C, crossover 234B, conductor 84C, loop 232C, conductor 64D, crossover 234C, conductor 84D, loop 232D, conductor 64E, crossover 234D and conductor 84E.

As is shown in FIGS. 13 and 14, conductor 84E connects coil 230 back to power harvesting circuit 110, through conductor 84F connector 106B and electrical path 184. Only four repetitions are shown here to limit the complexity of the drawings and text, an actual device is likely to have many more. It will also be noted that there are a number of ways to hold layers, 40, 60 and 80 apart in this package while providing free movement for them to wave in whatever environment it is placed in.

FIGS. 13 and 14 show one embodiment of linkages 104A and connectors 102A and 106A that are used to hold magnetic field layer 40, first layer 60 and second layer 80 at desired spacing while allowing magnetic field layer 40, first layer 60 and second layer 80 to all to swing or wave. In this embodiment linkages 104A and connectors 102A and 106A are mounted, joined, fixed or otherwise attached at one end to magnetic field layer 40, first layer 60 and second layer 80 respectively and at another end to one of pivot structures 103, 105 and 109 respectively. This embodiment also illustrates pivot structures 103, 105 and 109 and shows as pins that extend through linkages 104A, and through connectors 102A and 106A. However, in other embodiments hinges 103, 105 and 109 could take the form of a screw or any other known structure about which linkages 104A and connectors 102A and 106A can be rotated.

Figure 15:
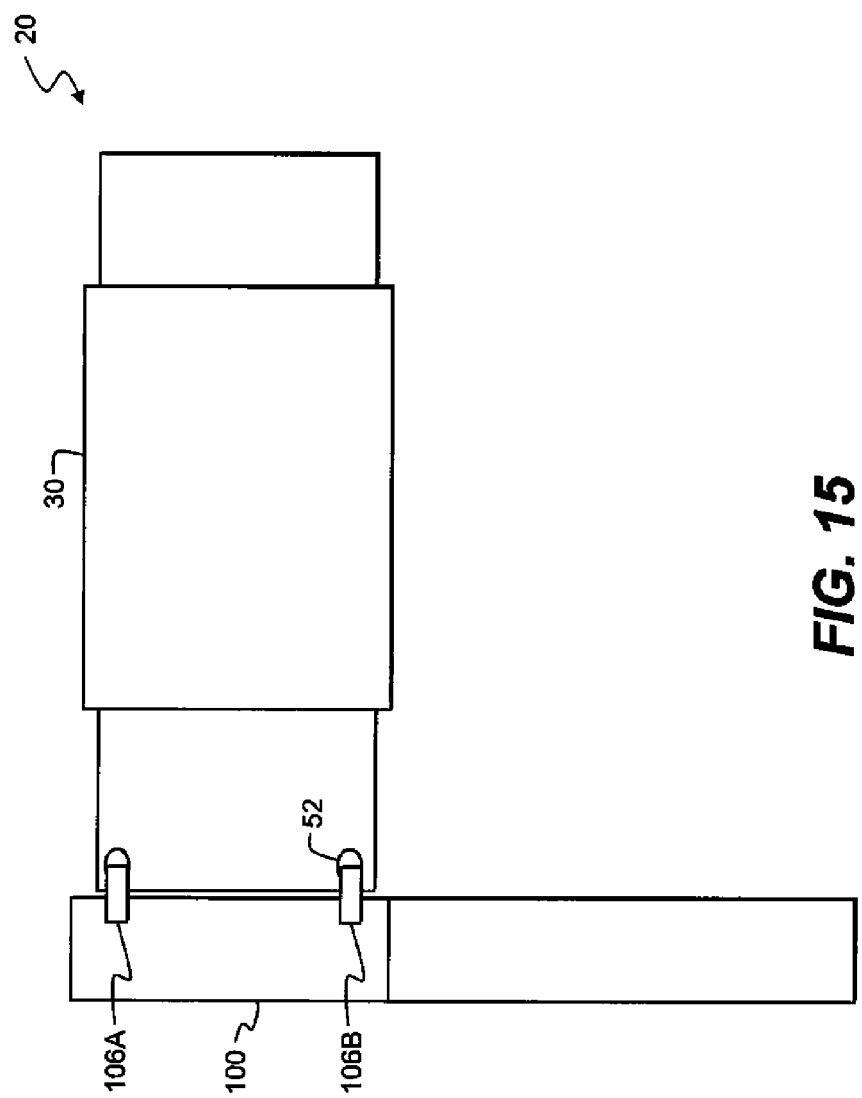
FIG. 15 shows an elevation view of one embodiment of an electrical generator.

FIG. 15 shows an elevation view of one embodiment of electrical generator 20. In the embodiment of FIG. 15, electrical generator 20 is provided in a form that is adapted to be driven by forces that are supplied by wind. In the embodiment of FIG. 15, mount 100 takes the form of a flagpole that supports electrical, generator 20 with width 26 arranged vertically so that generator 20 can be bent by wind currents at elevated heights. In the embodiment of FIG. 15, electrical generator 20 hangs from mount 100 in a manner that is consistent with a conventional flag and can optionally be printed or otherwise made to look like a conventional flag such as by wrapping electrical generator 20 in a cloth, simulated cloth cover or other cover.

Figure 16:
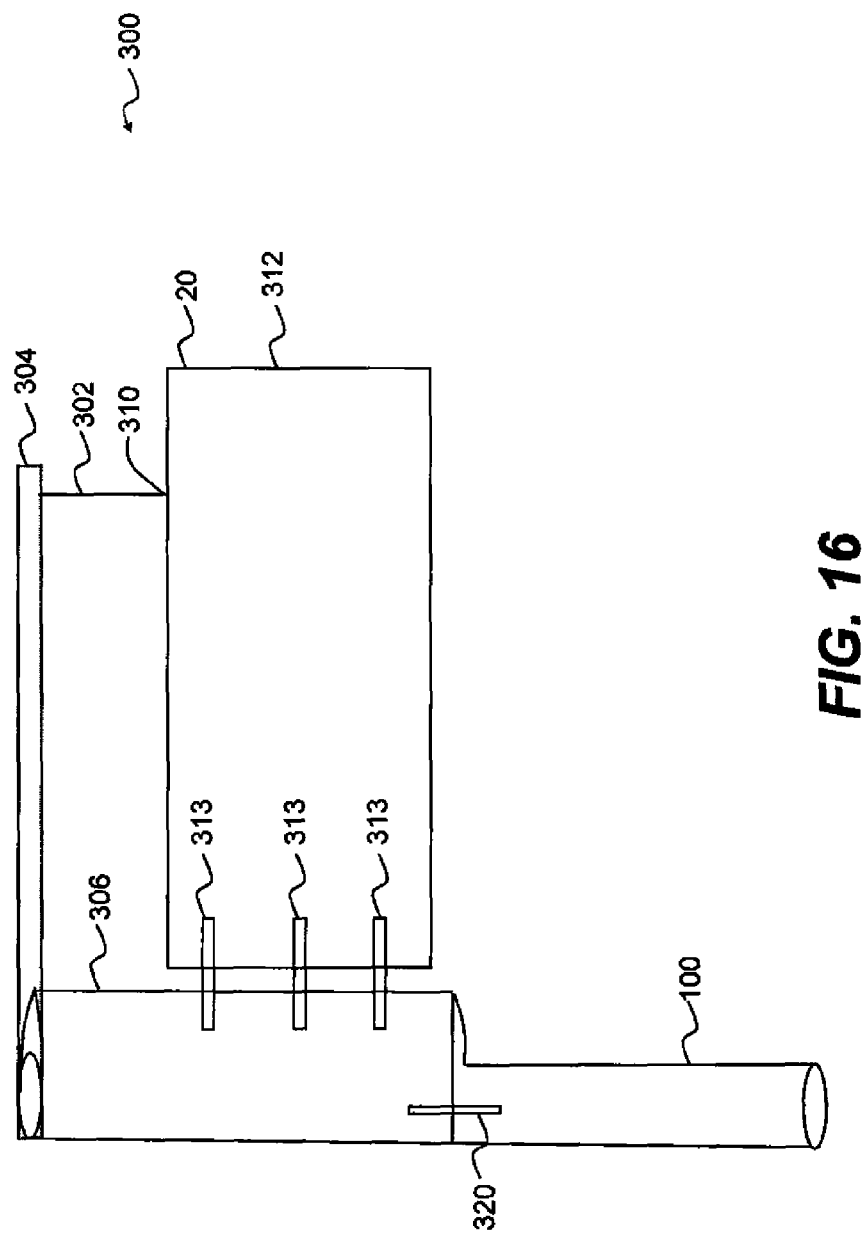
FIG. 16 shows and embodiment of an electrical generator and a support.

However, in the embodiment of FIG. 16, a support system 300 is used to support generator 20 in an extended position allowing lengthwise bending of generator 20 without requiring that a wind flow provide sufficient energy to overcome gravity in order to extend flag type embodiment 20 for bending as described herein. In this embodiment, support system 300 has a flexible line 302 that is connected to a support beam 304 and to generator 20 at a first support point 310.

Support beam 304, in turn, is supported by an airfoil 306 that is pivotally connected to mount 100 by way of a pin 320. In this embodiment, airfoil 306 is self adjusting based upon wind flow. As is also shown in FIG. 16, connections 313 are also provided that connect one end of generator 20 to airfoil 306. Connections 313 can be used to provide both mechanical support and electrical connections between generator 20 and airfoil 306. Airfoil 306 can be adapted to provide a stable position relative to airflow or to maintain an unstable position relative to the air flow to cause oscillation. This can be done for example by defining airflow characteristics of airfoil 306 to create a low pressure along at least one the sides of the device which might serve to align the device into the flow as well as creating turbulence.

In the embodiment of FIG. 16, support beam 304 moves with movements of airfoil 306 and flexible line 302 is connected to generator 20 at a distance that is separated from an end 312 of generator 20. This allows a bending node to come into existence between mountings 308 and first support point 310 leaving a tail portion between first support point 310 and end 312. In this way such a tail portion can achieve unconstrained bending to provide additional energy generation or to provide mechanical forces that help to induce subsequent bending of generator 20 such as by inducing a set of oscillations of generator 20. In other embodiments, generator 20 can be positioned in a flow horizontally or vertically with or without the support system 300.

Figure 17:
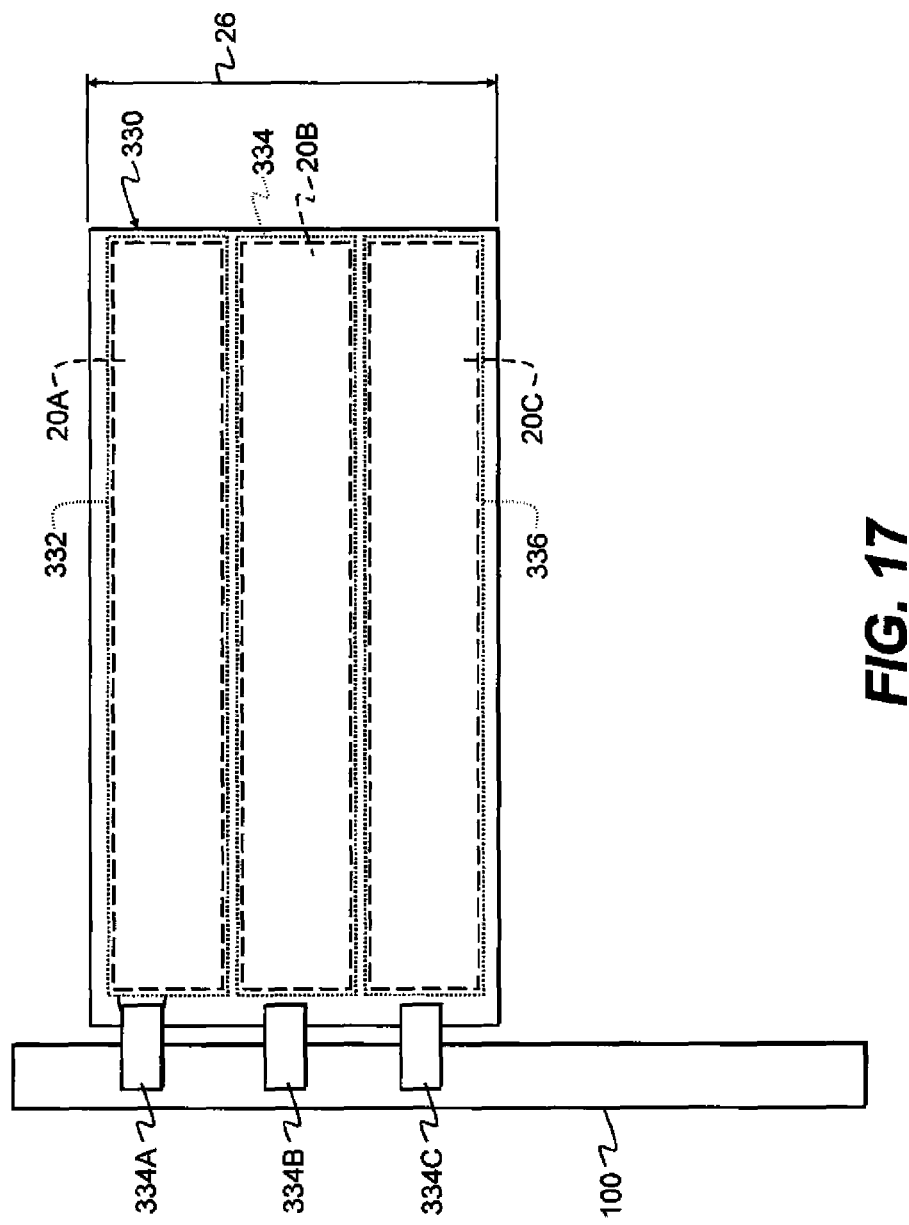
FIG. 17 illustrates another embodiment in which a plurality of electrical generators are supported by a cover.

Another wind driven flag type embodiment is illustrated in FIG. 17. As is shown in FIG. 17, in this embodiment a cover 330 is provided having a plurality of individual sleeves 332, 334, and 336 into which individual electrical generators 20A, 20B and 20C are located. Optionally as is shown in this embodiment cover 330 can provide connectors 334A, 334B and 334C. to connect electrical generators 20A, 20B, and 20C to mount 100.

Figure 18:
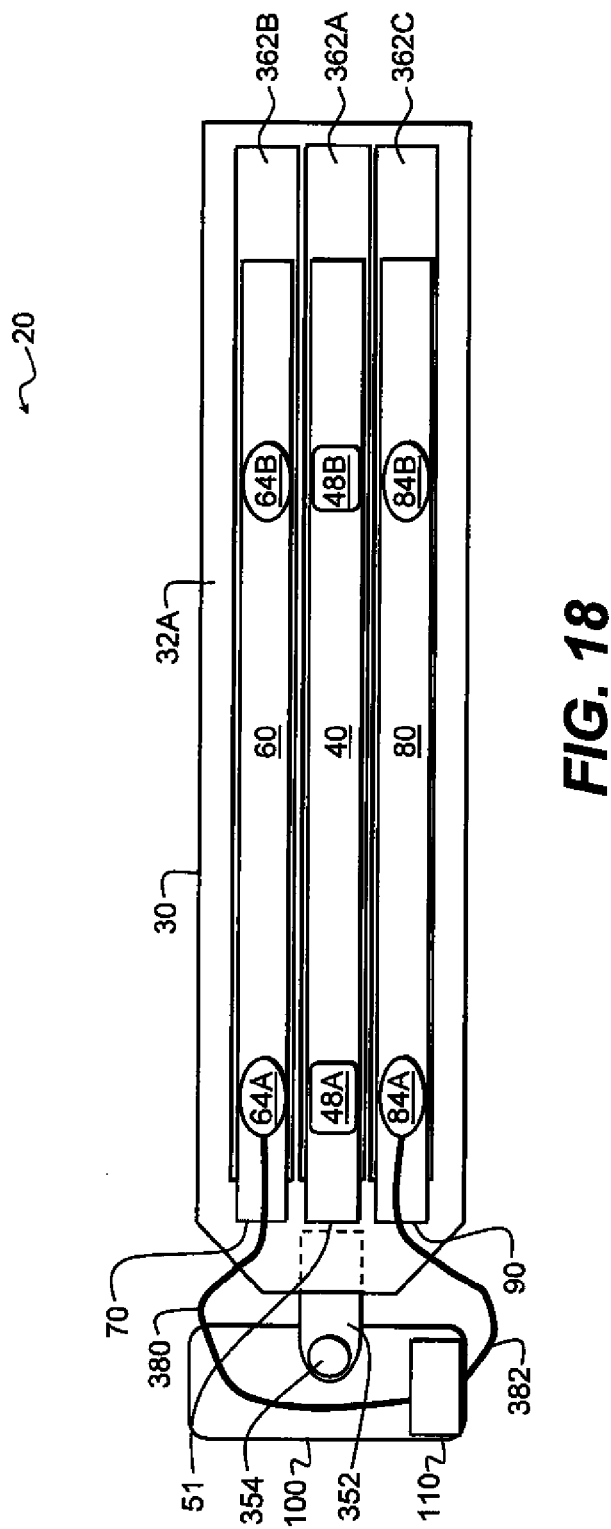
FIG. 18 illustrates another embodiment of electrical generator showing another embodiment of a holder.

FIG. 18 shows another embodiment of a generator 20. In this embodiment holder 30 holds magnetic field layer 40, first layer 60 and second layer 80 in pockets 362A, 362B and 362C which, as illustrated in FIG. 16, can provide an optional enclosure for magnetic field layer 40, first layer 60 and second layer 80. A first end of holding surface 32A is joined or otherwise attached to or formed with mounting ends 51, 70 and 90 of magnetic field layer 40, first layer 60 and second layer 80 respectively. In this embodiment, a first end of holder 30 is joined to mount 100 by way of a connector 352. As is shown in this embodiment holder 30 can provide a mechanical connection 352 to a linkage 354 that is fixed with mount 100. Optionally, in other embodiments, linkage 354 also provides a mechanical connection (not shown) to mechanically hold mounting ends 51, 70 and 90 of magnetic field layer 40, first layer 60 and second layer 80. As is shown this will force magnetic field layer 40, first layer 60 and second layer 80 to move in the pockets 362B, 362A and 362C. As shown, pockets 362A, 362B and 362C provide open space that the ends of pockets 362A, 362B and 362C that are opposite from the ends of pockets that are near linkage 354 so that magnetic field layer 40, first layer 60 and second layer 80 can shift relative to each other when generator 20 is bent. As is also shown in this embodiment, electrical connections between first layer 60 and second layer 80 power harvesting circuit 110 can be provided by way of optional electrical connectors 380 and 382.

Figure 19:
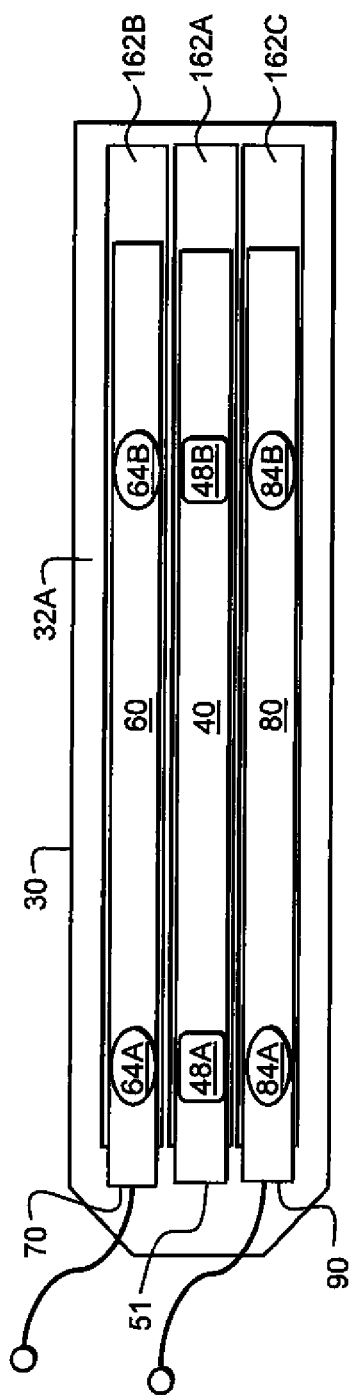
FIG. 19 illustrates another embodiment of an electrical generator showing yet another embodiment of a holder.
Figure 20:
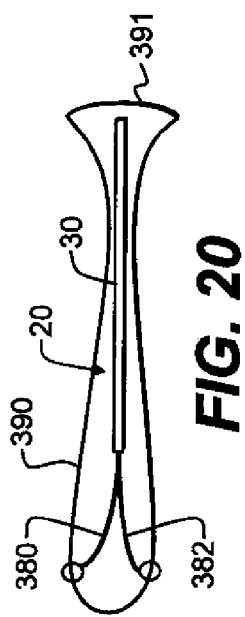
FIG. 20 illustrates another embodiment of an electrical generator showing a further embodiment of a holder.

FIGS. 19 and 20 illustrate other embodiments of generator 20, having a holder 30 with pockets 362A, 362B, and 362C of the type illustrated in FIG. 18 but that in this case does not have a linkage 352 that leads to a rigid mount 100. Instead, in this embodiment, generator 20 can be linked to a flexible line or cable or flexible material that allows greater freedom of movement of generator 20 and that also eliminates some of the mechanical wear points that can arise when rigid mountings are used. For example, the embodiment of FIGS. 19 and 20 operates as described in FIG. 18 but can use electrical lines to 382 in lieu of linkage 364.

This approach increases the flexibility of generator 20 because the device might be integrated into the body of a larger device, thereby not requiring a separate mount. Additionally, power harvesting circuit 110 can be located in such a larger device. In this embodiment 380 and 382 deliver power to load 380A and 382A where these loads could be separate or one and the same.

FIG. 20 shows a generator 20 having a holder 30 arranged as shown in FIG. 19 within an example device 390 shown here as a fishing lure. In the embodiment of FIG. 20, generator 20 provides power to light eyes, so as to attract fish. Deflector 391 is added to create or enhance movement of the embodiment of holder 30 as well as generator 20. Buff objects might be placed at the head or tail of an enclosure to create or enhance movement to a desired oscillation for optimal output of the embodiment in any flow gas or liquid.

FIGS. 21 and 22 shows still another embodiment of a holder 30 having an integrated magnetic field layer 40. In this embodiment, magnetic holder 30 is made from a stretchable material and integrated magnetic field layer 40 is therefore also stretchable. In this regard what is shown here is a holder 30 having two pockets 400 and 402 that are separated by a layer 404 of holder 30 having a magnetic field source 48A and a magnetic field source 48B. In this embodiment, a pin 408 holds a mounting end 70 of first layer 60 and a mounting end 90 of second layer 80 relative to a first end 410 of pocket 400 and a first end 412 of pocket 402. However, mounting ends 51, 70 and 90 can be held in other ways as is shown for example in FIG. 17.

As is shown in FIG. 21, when holder 30 is unbent, first conductor 64A and third conductor 84A, are in a first position relative to magnetic field source 48A and second conductor 64B and fourth conductor 84B are also in a first position relative to magnetic field source 48B. When, as shown in FIG. 22, holder 30 is bent, first conductor 64A and third conductor 84A move to a different position relative to magnetic field source 48A of magnetic field and second conductor 64B and fourth conductor 84B also move to a different position. These movements have the combined effects of movement due to the radii changes as well as the stretching characteristics of layer 404 which causes conductors 64A, 64B, 84A and 84B to move through a change in field strength which induces current therein. This generally occurs as is described in greater detail above.

As is also shown in FIGS. 21 and 22, in this embodiment holder 30 is linked at one end to a mounting point 420 and at another end to another mounting point 422. Accordingly, to achieve bending of holder 30, it is necessary to stretch holder 30. This causes movement of magnetic field sources 48A and 48B which can influence the amount of current induced in conductors 64A, 64B, 84A and 84B.

FIG. 23 shows another embodiment of a holder 30 of the type shown in FIG. 17 and that additionally stretches when generator 20 is exposed to flow. In the embodiment of FIG. 23, holder 30 is shown in form that, when positioned in a flow, and held or pulled through the flow by a force that is applied, for example at point 430, will be oscillated, and will be stretched by the flow. These combined effects can increase movement between magnetic field layer 40, first layer 60 and second layer 80 thereby increasing power output.

It will be appreciated that in any of the above embodiments, a magnetic focusing material such as iron particles can be supplied within the conductor layers surrounding the conductor lines as a magnetic focusing material. In some embodiments of this type, magnetic fields from magnetic field layer 40 can pull first layer 60 and second layer 80 together and act as a holder 30. In such embodiments, separation layer 120 can be used to provide friction reducing materials between the layers.

It will also be appreciated that conductors such as conductors 64A and 64B, and conductors 84A and 84B are shown in schematic form and that the illustrations provided herein are not limiting as to the number, shape, size orientation, or composition of the conductors illustrated herein so long as the conductors are capable of generating current when passed through a changing magnetic field as is described herein or as is known in the art.

The invention has been described in detail with particular reference to certain preferred embodiments thereof, but it will be understood that variations and modifications can be effected within the spirit and scope of the invention.

What is claimed is:

1. A method comprising:
   placing a flexible magnetic field source between a first flexible plurality of conductors and a second flexible plurality of conductors in a flow of a material;
   holding the flexible magnetic field source, the first flexible plurality of conductors and the second flexible plurality of conductors at one end along a length while allowing opposite ends of the flexible magnetic field source, the first flexible plurality of conductors and the second flexible plurality of conductors to move relative to each other along the length;
   arranging the flexible magnetic field source, the first flexible plurality of conductors and the second flexible plurality of conductors so that forces provided by the fluid to cause the flexible magnetic field source, the first flexible plurality of conductors, and the second flexible plurality of conductors to bend along the length; and
   wherein the bending changes the radiuses of the flexible magnetic field source, the first flexible plurality of conductors and the second flexible plurality of conductors to move the first plurality of conductors and the second plurality of conductors relative to a magnetic field of the flexible magnetic field source that is different at different portions along the length and to induce a currents in the first plurality of conductors and in the second plurality of conductors.

2. The method of claim 1, further comprising the step of supporting the flexible magnetic field source, the first flexible plurality of conductors and the second flexible plurality of conductors at a position along the length that is between the ends that are held and the movable ends to allow a bending node to come into existence between a mounting and a first support point.

3. The method of claim 2, further comprising positioning the first support point to leaving a tail portion between the first support point and an end of the he flexible magnetic field source, the first flexible plurality of conductors and the second flexible plurality of conductors to allow unconstrained bending to provide additional energy generation or to provide mechanical forces that help to induce additional bending of the flexible magnetic field source, the first flexible plurality of conductors and the second flexible plurality of conductors.

4. The method of claim 1, further comprising the step of supporting the holding the flexible magnetic field source, the first flexible plurality of conductors and the second flexible plurality of conductors with a mounting that reacts to the force applied by the flow by urging bending of the flexible magnetic field source, the first flexible plurality of conductors and the second flexible plurality of conductors.

5. The method of claim 1, further comprising using a cover having pockets to hold the flexible magnetic field source, the first flexible plurality of conductors and the second flexible plurality of conductors with a mounting that reacts to the flow by urging bending of the flexible magnetic field source, the first flexible plurality of conductors and the second flexible plurality of conductors.

6. The method of claim 1, wherein at least one of the flexible magnetic field source, the first flexible plurality of conductors and the second flexible plurality of conductors are held by a holder that reacts to the flow at least in part by stretching at least one of the flexible magnetic field source, the first flexible plurality of conductors and the second flexible plurality of conductors.

7. The method of claim 1, wherein the magnetic field layer provides a magnetic field that varies in intensity along a length of the magnetic field layer to provide variations in field intensity that are generally parallel to said conductors.

8. The method of claim 1, further comprising rotating poles of one or more magnetic fields during the bending.

9. The method of claim 1, further comprising dampening the magnetic fields between the magnetic field sources and the first flexible plurality of conductors.

10. The method of claim 1, further comprising dampening the magnetic fields between the magnetic field sources and the second flexible plurality of conductors.

11. The method of claim 1, further comprising positioning magnetically conductive material between poles of the same polarity.

12. The method of claim 1, further comprising the steps of alternately dampening and conducting the magnetic field from the magnetic field source.

13. The method of claim 1 wherein during a first direction of the bending, the first plurality of conductors has an outer bending radius that is greater than a middle bending radius of the magnetic field source and the second plurality of conductors bends at an inner radius that is less than the middle radius and wherein the first plurality of conductors move in a first direction relative to the magnetic field to induce a first current in the first flexible plurality of conductors and the second flexible plurality of conductors move in a second direction relative to the magnetic field to induce a second current in the second plurality of conductors that is opposite to the first current.

14. The method of claim 1, wherein the first plurality of conductors and second plurality of conductors comprise respectively a first portions of a coil that extend across the width of the magnetic field layer proximate to a first side of the magnetic field layer and second portions of the coil that extend across the width of the magnetic field layer proximate to a second side of the magnetic field layer.

15. The method of claim 1, wherein the arrangement of the first flexible plurality of conductors, the second flexible plurality of conductors, and the variable magnetic field are selected so that the electrical generator bends only in one direction along the length of the generator apparatus in response to an application of kinetic energy at any given time and oscillates between a first direction of bending and a second direction of bending as an amount of applied kinetic energy increases.

16. The method of claim 1, wherein the placing of the flexible magnetic field source between the first flexible plurality of conductors and the second flexible plurality of conductors in a flow of a material includes placing a friction reducing material between the flexible magnetic field source and at least one of the first flexible plurality of conductors and a second flexible plurality of conductors.

17. The method of claim 1, wherein the placing of the flexible magnetic field source between the first flexible plurality of conductors and the second flexible plurality of conductors in a flow of a material includes placing a separation material between the magnetic field source and at least one of the first flexible plurality of conductors and the second flexible plurality of conductors.

18. The method of claim 1, wherein one of the flexible magnetic field source, the flexible first plurality of conductors, and the flexible second plurality of conductors has wrapping portions that extend beyond the widths of the other ones of the first layer, second layer and third layer to form holding surfaces within which the other ones of the first layer, second layer and third layer can bend and within which a separating material is placed to reduce friction between the moving layers and the wrapping portions.

19. The method of claim 1, wherein the flexible magnetic field source, the flexible first plurality of conductors, and the flexible second plurality of conductors are arranged within a buffed body that is shaped to urge the bending.

* * * * *